(12) United States Patent
Fujinami et al.

(10) Patent No.: US 9,603,007 B2
(45) Date of Patent: Mar. 21, 2017

(54) BASE STATION APPARATUS AND COMMUNICATION SYSTEM

(71) Applicant: NEC CORPORATION, Tokyo (JP)

(72) Inventors: Makoto Fujinami, Tokyo (JP); Jun Awano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/372,656

(22) PCT Filed: Jan. 16, 2013

(86) PCT No.: PCT/JP2013/000140
§ 371 (c)(1),
(2) Date: Jul. 16, 2014

(87) PCT Pub. No.: WO2013/114791
PCT Pub. Date: Aug. 8, 2013

(65) Prior Publication Data
US 2015/0029939 A1    Jan. 29, 2015

(30) Foreign Application Priority Data

Feb. 3, 2012 (JP) .................................. 2012-022335

(51) Int. Cl.
*H04W 84/04* (2009.01)
*H04W 88/08* (2009.01)
(Continued)

(52) U.S. Cl.
CPC ............. *H04W 8/22* (2013.01); *H04L 61/103* (2013.01); *H04W 12/08* (2013.01); *H04W 60/00* (2013.01);
(Continued)

(58) Field of Classification Search
CPC ... H04W 80/04; H04W 80/045; H04W 80/06; H04W 88/06; H04W 36/0011;
(Continued)

(56) References Cited

U.S. PATENT DOCUMENTS 7,031,276 B2 *   4/2006   Inoue ...................... H04L 12/14
                                                        370/328
7,089,033 B2 *   8/2006   Leinonen ............... H04B 1/005
                                                        375/219
(Continued)

FOREIGN PATENT DOCUMENTS

JP    2003-189358 A    7/2003
JP    2005-045436 A    2/2005
(Continued)

OTHER PUBLICATIONS

International Search Report (ISR) (PCT Form PCT/ISA/210), in PCT/JP2013/000140, dated Apr. 2, 2013.
(Continued)

*Primary Examiner* — Ayaz Sheikh
*Assistant Examiner* — Debebe Asefa
(74) *Attorney, Agent, or Firm* — McGinn IP Law Group, PLLC

(57) ABSTRACT

A base station apparatus includes a first identification information acquisition unit for acquiring first identification information for identifying a terminal, the terminal being under management of the base station apparatus, a second identification information generation unit for generating second identification information associated with the first identification information acquired by the first identification information acquisition unit, and a terminal identification information notification unit for notifying an external device of the second identification information generated by the second identification information unit as information for
(Continued)

identifying the terminal. An external apparatus is notified of identification information generated based on highly confidential first identification information within a base station, so that personalization can be feasible between a terminal and the external apparatus.

20 Claims, 14 Drawing Sheets

(51) Int. Cl.
*H04W 60/00* (2009.01)
*H04W 8/22* (2009.01)
*H04W 12/08* (2009.01)
*H04L 29/12* (2006.01)
*H04W 76/02* (2009.01)
*H04W 68/02* (2009.01)

(52) U.S. Cl.
CPC ......... *H04W 68/02* (2013.01); *H04W 76/021* (2013.01); *H04L 61/2007* (2013.01); *H04W 84/045* (2013.01); *H04W 88/08* (2013.01)

(58) Field of Classification Search
CPC .... H04W 88/182; H04W 64/00; H04L 69/16; H04L 45/00; H04L 47/14
See application file for complete search history.

(56) References Cited

U.S. PATENT DOCUMENTS

| 2003/0112803 | A1 | 6/2003 | Matsugatani et al. |
| 2003/0233329 | A1 | 12/2003 | Laraki et al. |
| 2008/0310425 | A1 | 12/2008 | Nath et al. |
| 2010/0034181 | A1 | 2/2010 | Shinozaki |

FOREIGN PATENT DOCUMENTS

| JP | 2005-051671 A | 2/2005 |
| JP | 2010-41585 A | 2/2010 |
| JP | 2010-531094 A | 9/2010 |
| JP | 2011-135417 A | 7/2011 |
| WO | WO 2005/086423 A1 | 9/2005 |
| WO | WO 2011/045882 A1 | 4/2011 |
| WO | WO 2011/092772 A1 | 8/2011 |

OTHER PUBLICATIONS

RFC 6265 (HTTP State Management Mechanism), Apr. 2011 <http://tools.ietf.org/pdf/rfc6265.pdf>.
Extended European Search Report dated Dec. 11, 2015.
Japanese Office Action dated Jan. 17, 2017 with an English translation thereof.

* cited by examiner

| USER UNIQUE ID | GENERATED USER UNIQUE TEMPORARY ID | IP DISPENSED TO TERMINAL | THIRD PARTY ID | IP OF THIRD PARTY SERVER |
|---|---|---|---|---|
| TERMINAL IMSI 1 | UNIQUE TEMPORARY ID FOR THIRD PARTY 1 | IPa | THIRD PARTY 1 ID | THIRD PARTY 1 SERVER IPp |
| TERMINAL IMSI 1 | UNIQUE TEMPORARY ID FOR THIRD PARTY 2 | IPa | THIRD PARTY 2 ID | THIRD PARTY 1 SERVER IPs |
| TERMINAL IMSI 2 | UNIQUE TEMPORARY ID FOR THIRD PARTY 1 | IPb | THIRD PARTY 1 ID | THIRD PARTY 1 SERVER IPp |
| TERMINAL IMSI 2 | UNIQUE TEMPORARY ID FOR THIRD PARTY 2 | IPb | THIRD PARTY 2 ID | THIRD PARTY 1 SERVER IPs |
| TERMINAL IMSI 2 | UNIQUE TEMPORARY ID FOR THIRD PARTY 2 | IPb | THIRD PARTY 2 ID | THIRD PARTY 1 SERVER IPt |

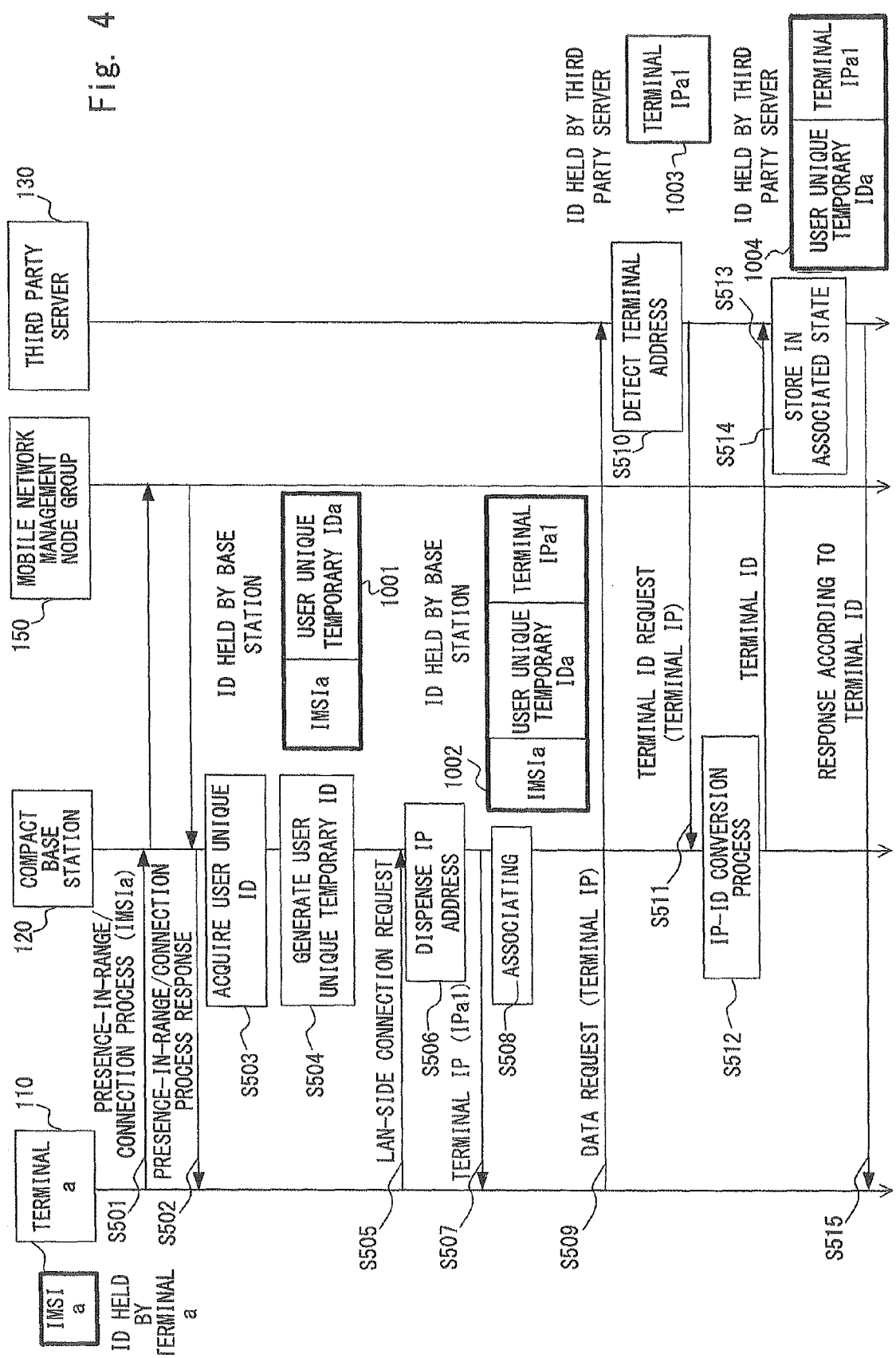

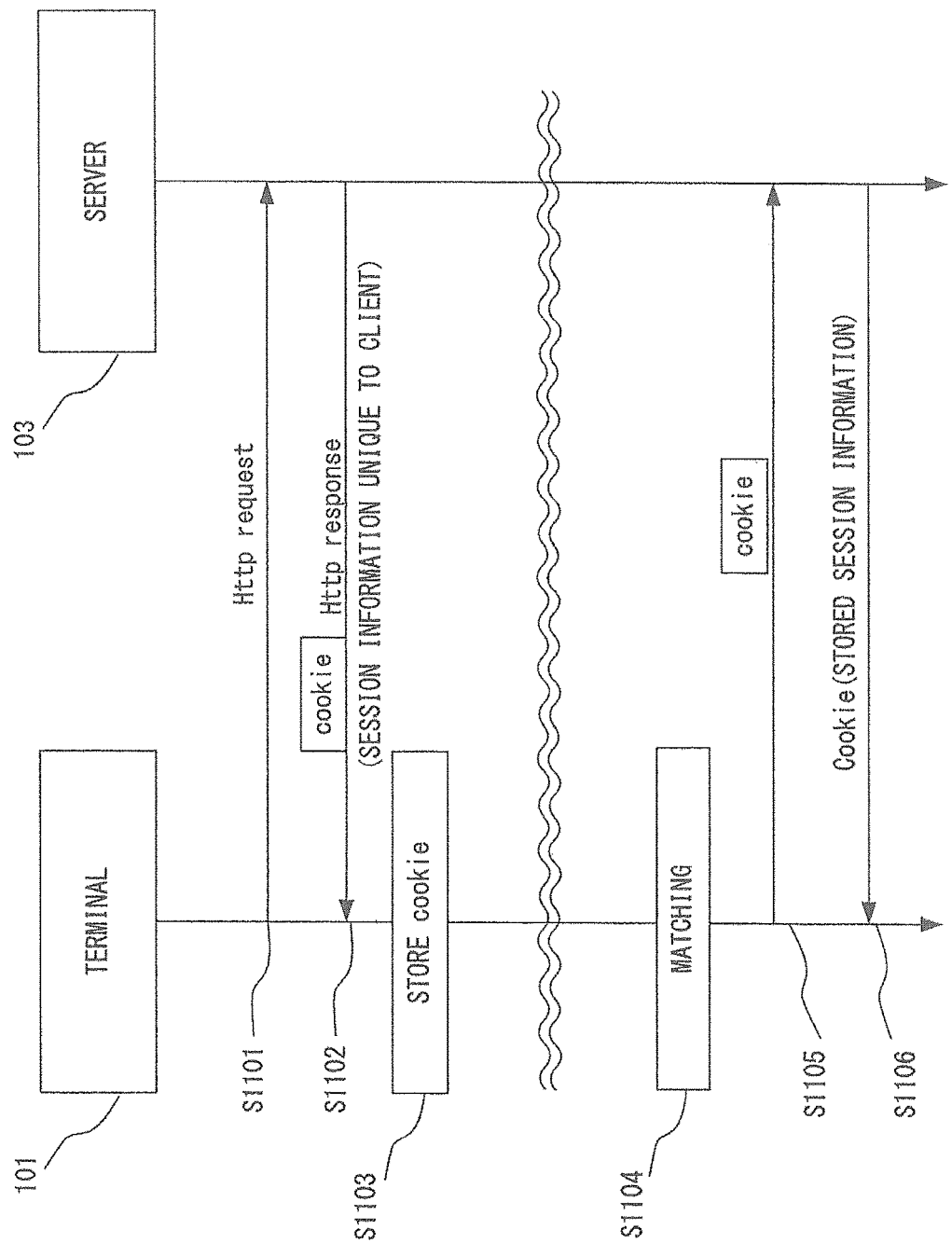

BASE STATION APPARATUS AND COMMUNICATION SYSTEM

TECHNICAL FIELD

The present invention relates to a base station apparatus and a communication system including the base station apparatus, and in particular to a compact base station apparatus typified by a femto-base station and a communication system including the compact base station apparatus.

BACKGROUND ART

In recent years, formations of mobile networks including compact base stations have been underway. In general, when a terminal connects to the Internet in a mobile network, the terminal usually connects to the Internet by temporarily connecting through a mobile network management node in the operator network.

Note that for a mobile network including a compact base station, a technique in which when a terminal connects to the Internet through the compact base station, part of the traffic of the operator network is directly directed to the Internet or a LAN in order to reduce the load on the traffic has been examined.

Such a technique for sending traffic to a sub-route such as a LAN is called "traffic off-load" because this technique reduces the load on the main-route. Patent literature 1 discloses a technique for distributing traffic to the main-route and a sub-route(s).

The use of a sub-route to which traffic is off-loaded not only reduces the load on the traffic but also leads to a possibility of provision of a new service(s) such as creation of a website which only visiting customers can access.

Further, a server that provides services can obtain information tied to users (e.g., user attributes (genders, ages, and so on)) and provide a personalized service(s) to each user by using that information. By doing so, the satisfaction of users can be improved. As a result, stores can keep users and increase profits. Further, the user-friendliness on the user side also improves. Therefore, there are advantages for both the stores and the users.

Note that in order to realize the above-described personalization for each user, the server that provides a service needs to uniquely identify terminals or users using the terminals irrespective of the IP-addresses assigned to the terminals. This is because the address assigned to a terminal is usually not fixed for a particular user and could change every time the terminal connects to the compact base station.

Patent literature 2 discloses a technique in which even when a terminal performs a handover and thereby moves to a neighboring base station, the IP-address assigned to an application in the terminal as observed from the server side is unchanged.

Further, Non-patent literature 1 discloses a technique for realizing personalization for each user by using a cookie of an http protocol. The personalization method disclosed in Non-patent literature 1 is explained with reference to a sequence diagram shown in FIG. 14.

Firstly, a terminal 101 transmits an http get request to a third party server 103 (step S101). Upon receiving the http get request, the third party server 103 sets a set-cookie option in an http header and sends back an http response to the terminal 101 (step S1102). At this point, the terminal 101 detects the presence of the set-cookie option in the http response sent back from the third party server 103, and stores the information (step S1103).

In general, the cookie sent back in the step S1102 contains, for example, a session ID that is managed in an http layer. When connection is established again after the session is disconnected, it is possible to find out the previous session. As a result, it is possible to detect that the terminal is the same as the previous terminal even if the IP-address of the terminal has been changed.

When the terminal 101 connects to the third party server 103 again, the terminal 101 determines whether the URL of the connected server matches the URL recorded in the stored cookie (step S1104). As a result of the matching in the step S1104, when those two URLs match each other, the terminal 101 sends out the cookie as an extended header of the http get request (step S1105). The third party server 103, to which the cookie is sent, detects the cookie sent from the terminal 101 and performs a process(es) according to the content of the cookie.

By performing the processes in accordance with the above-described flow, it is possible to uniquely identify the terminal 101 on the third party server 103 side irrespective of the IP address assigned to the terminal 101. Further, by storing attribute information or the like of an end user(s) who possesses a terminal in an application layer in addition to the cookie, it is also possible to uniquely identify the end user possessing the terminal and return a personalized response to that end user.

CITATION LIST

Patent Literature

Patent literature 1: Japanese Unexamined Patent Application Publication No. 2011-135417
Patent literature 2: Japanese Unexamined Patent Application Publication No. 2003-189358

Non Patent Literature

Non-patent literature 1: RFC 6265 (HTTP State Management Mechanism), April, 2011 <http://tools.ietf.org/pdf/rfc6265.pdf>

SUMMARY OF INVENTION

Technical Problem

In the technique disclosed in the above-described Patent literature 2, the terminal needs to have a router function, exchange routing information with a gateway newly disposed on the network side, and write and record the routing information on a routing table. Therefore, in addition to the problem that ordinary terminals that do not have the router function cannot be managed in a unified fashion, there is a problem that the processing and the load on the terminal side increases and hence the battery life is shortened.

Further, in the personalization method disclosed in Non-patent literature 1, the means for obtaining the unique terminal ID of the terminal 101 in the third party server 103 depends on the application type.

Therefore, the above-described personalization method in the related art is limited to the https, thus causing a problem that the method cannot be applied to the provision of personalized services by other applications.

In view of the aforementioned problems, an object of the present invention is to provide means capable of uniquely identifying a terminal on the server side without requiring any modification to the terminal itself and without depending on the specifications of the protocol.

Solution to Problem

A base station apparatus according to the present invention includes: first identification information acquisition means for acquiring first identification information for identifying a terminal, the terminal being under management of the base station apparatus; second identification information generation means for generating second identification information associated with the first identification information acquired by the first identification information acquisition means; and terminal identification information notification means for notifying an external device of the second identification information generated by the second identification information means as information for identifying the terminal.

Further, a communication system according to the present invention is a communication system including a base station apparatus capable of wireless connecting to a terminal, and a service providing server connected to the base station apparatus, the terminal being under management of the base station apparatus, in which the base station apparatus includes: first identification information acquisition means for acquiring first identification information for identifying the terminal under management of the base station apparatus; second identification information generation means for generating second identification information associated with the first identification information acquired by the first identification information acquisition means; and terminal identification information notification means for notifying the service providing server of the second identification information generated by the second identification information means as information for identifying the terminal, and the service providing server includes: second identification information receiving means for receiving the second identification information notified from the base station; and service providing means for providing a service based on the second identification information received by the second identification information receiving means.

Advantageous Effects of Invention

According to the present invention, it is possible to provide means capable of uniquely identifying a terminal on the server side without depending on the specifications of the protocol.

BRIEF DESCRIPTION OF DRAWINGS

FIG. 3 shows an example of a management table stored in the compact base station apparatus according to the first exemplary embodiment;

FIG. 4 is a sequence diagram showing an operation flow of a communication system according to the first exemplary embodiment;

FIG. 14 is a sequence diagram showing an operation flow of a communication system according to related art.

DESCRIPTION OF EMBODIMENTS

Exemplary embodiments according to the present invention are explained hereinafter with reference to the drawings. In the following explanation, preferable exemplary embodiments in accordance with the present invention are shown. However, the present invention is not limited to those exemplary embodiments. In the following explanation, components/structures to which the same symbols are assigned are substantially identical components/structures.

First Exemplary Embodiment

Figure 1:
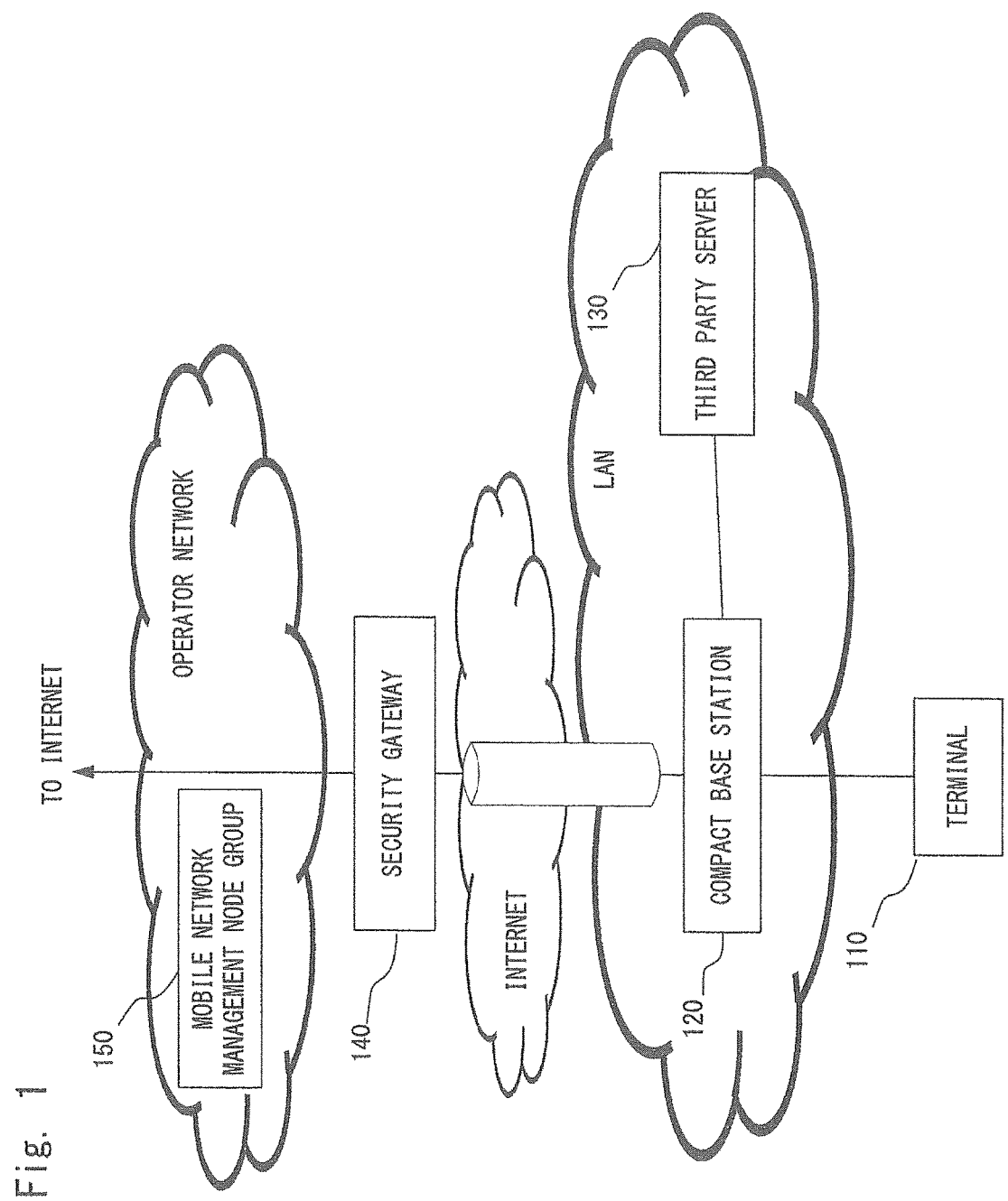
FIG. 1 is a diagram for explaining a configuration of a communication system according to a first exemplary embodiment.

Exemplary embodiments according to the present invention are explained hereinafter with reference to the drawings. FIG. 1 is a block diagram showing a connection configuration of a communication system 10 according to a first exemplary embodiment. The communication system 10 includes a terminal 110, a compact base station 120, a third party server 130, a security gateway 140, and a mobile network management node group 150.

The terminal 110 is a mobile terminal apparatus possessed by an end user and performs radio communication with the compact base station 120.

The compact base station 120 is a compact base station apparatus that provides a communication connection service in a small coverage area typified by the femto-cell. The compact base station that covers such a femto-cell may also be called "femto-base station", "femto-cell base station", or "home base station". The compact base station 120 is connected to the security gateway 140 through the Internet by using encrypted connection.

The third party server 130 is a server disposed on the same LAN as that of the compact base station 120. The third party server 130 is connected to the compact base station 120 through the LAN and provides various services to the terminal 110.

The security gateway 140 is a gateway apparatus disposed on the boundary of the operator network with the Internet.

The mobile network management node group 150 is located within the operator network, and manages information used in the mobile network such as user information and terminal information and controls/manages a node(s) located within the operator network. Further, the mobile network management node group 150 also serves as a gateway when the terminal 110 connects to a server or a node located on the Internet.

Figure 2:
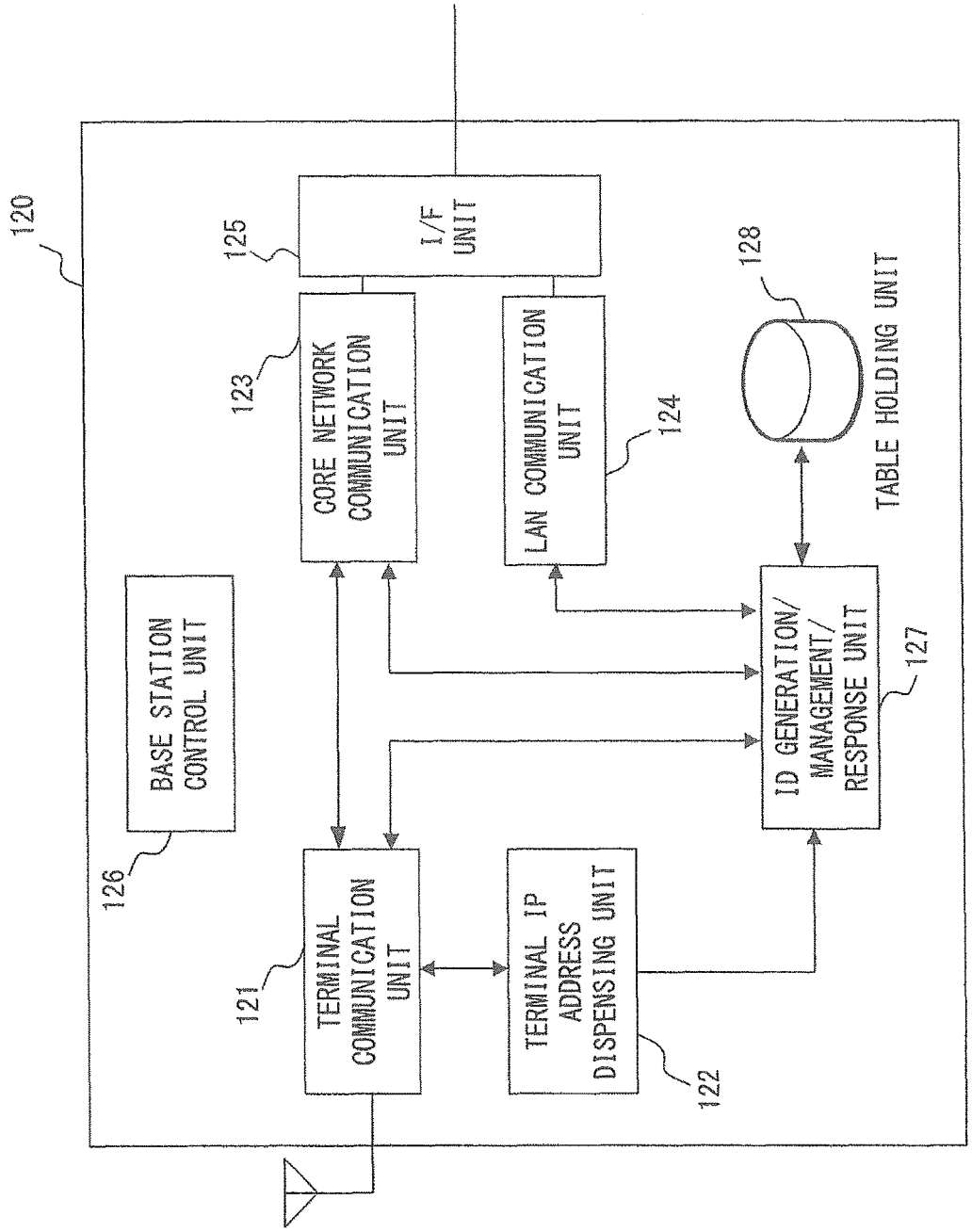
FIG. 2 is a block diagram showing a configuration of a compact base station apparatus according to the first exemplary embodiment.

Next, the compact base station 120 is explained in detail. FIG. 2 is a block diagram showing a specific configuration of the compact base station 120. The compact base station 120 includes a terminal communication unit 121, a terminal IP address dispensing unit 122, a core network communication unit 123, a LAN communication unit 124, an I/F unit 125, a base station control unit 126, an ID generation/management/response unit 127, and a table holding unit 128.

The terminal communication unit 121 communicates with the terminal 110 that is under management of the own station. The terminal communication unit 121 receives a presence-in-range/connection process request (position registration request) transmitted from the terminal 110 under management of the own station. The presence-in-range/connection process request received by that terminal communication unit 121 is temporarily sent to the ID generation/management/response unit 127 for the acquisition of a unique ID for the terminal 110, and then sent from the ID generation/management/response unit 127 to the core network communication unit 123. Further, the terminal communication unit 121 sends back a presence-in-range/connection process response received from the ID generation/management/response unit 127 to the terminal 110.

The terminal IP address dispensing unit 122 receives a request for connection to the LAN side transmitted from the terminal 110 under management of the own station through the terminal communication unit 121, and dispenses an IP address to that terminal 110. Note that when the terminal IP address dispensing unit 122 dispenses an IP address for communication through the LAN to each terminal under management of the compact base station 120, the terminal IP address dispensing unit 122 notifies the ID generation/management/response unit 127 of the dispensed IP address. In this way, the ID generation/management/response unit 127 can associate the user unique ID with the dispensed IP address and store them in the associated pair in the table holding unit 128.

The core network communication unit 123 communicates with a node located within the operator network. The core network communication unit 123 transmits a presence-in-range/connection process request from the terminal 110, which has been received from the ID generation/management/response unit 127, to the mobile network management node group 150 through the I/F unit 125. Further, the core network communication unit 123 receives a presence-in-range/connection process response, which is the response to the above-described request and transmitted from the mobile network management node group 150, through the I/F unit 125. The received presence-in-range/connection process response is transmitted to the ID generation/management/response unit 127 for the acquisition of a unique ID for the terminal 110 and then transmitted from the terminal communication unit 121 to the terminal 110.

The LAN communication unit 124 communicates with a node located within the LAN. The LAN communication unit 124 communicates with the node located within the LAN based on a data request or the like received by the terminal communication unit 121.

The I/F unit 125 is a physical interface for external communication of the core network communication unit 123 and the LAN communication unit 124.

The base station control unit 126 controls the own compact base station 120 based on information that is received by the terminal communication unit 121, the core network communication unit 123, and the LAN communication unit 124, and sent from them to the base station control unit 126.

The ID generation/management/response unit 127 receives ID information unique to a user through the core network communication unit 123 or the terminal communication unit 121 every time access from the terminal occurs, and stores the received ID information in the table holding unit 128. Specifically, the ID generation/management/response unit 127 extracts the ID unique to the user (hereinafter referred to as "user unique ID") from the presence-in-range/connection process request sent through the terminal communication unit 121 or the presence-in-range/connection process response sent through the core network communication unit 123, and stores the extracted user unique ID in the table holding unit 128.

This user unique ID is usually recorded in a SIM card disposed inside the terminal so that the operator can provide a different service(s) for each user and/or charge each user in a different manner. The user unique ID is transmitted to the operator network when, for example, the terminal is attached to the base station. In the case of 3GPP (3rd Generation Partnership Project), for example, a femto-cell can acquire an ID called "IMSI (International Mobile Subscriber Identity)" of a terminal under management thereof. However, the user unique ID is not necessarily limited to the IMSI of the 3GPP and may instead be a user unique ID in 3GPP2, WiMAX, or the like.

Further, the ID generation/management/response unit 127 associates the IP address that the terminal IP address dispensing unit 122 has dispensed to the terminal 110 with the user unique ID of that terminal 110, and stores them in the associated state in the table holding unit 128.

Further, the ID generation/management/response unit 127 generates an ID unique to the terminal 110 that is valid only for the third party server 130 on the LAN side, and sends the generated unique ID to that third party server 130. A temporary identifier for identifying the terminal 110 that is generated by the ID generation/management/response unit 127 based on the IP address of that terminal 110 is called "user unique temporary ID".

Note that in the case of 3GPP, for example, the same user unique ID is continuously assigned to the same user unless that user cancels the contract with the operator. In contrast to this, the user unique temporary ID according to the present invention is assigned in such a manner that when the terminal 110 is located in the range of a given compact base station 120 and under the management of that compact base station 120, the user unique temporary ID is certainly unique and always the same for the third party.

The user unique temporary ID is generated so that, instead of using the ID used in the operator network, the security requirement is somewhat relaxed and a different terminal ID is assigned for each third party. For example, assume a case where user unique temporary IDs that are managed by a given third party have been leaked. In that case, it is possible to cope with the leakage by merely generating different IDs only for that third party.

Note that the above-described user unique temporary ID according to the present invention is different from the TMSI (Temporary Mobile Subscriber Identity) that is generated by the terminal 110 based on the IMSI stored in the SIM according to 3GPP in the purpose, the entity that generates the IDs, the timing, and so on, though they are similar in that they are both temporary IDs. That is, the concept of the user unique temporary ID according to the present invention is different from that of the TMSI.

Note that the ID generation/management/response unit 127 may acquire the IP address of the third party server 130 at a timing at which the ID generation/management/response unit 127 receives an inquiry using the aforementioned terminal IP address as key information, and store the acquired IP address in the table holding unit 128.

Further, the ID generation/management/response unit 127 may generate a user unique temporary ID and send the generated IP address to the third party server 130 when the ID generation/management/response unit 127 receives an inquiry using the IP address of the terminal 110 as key information from the third party server 130.

Further, the ID generation/management/response unit 127 may store the third party ID and the third party IP address in the table holding unit 128 in advance by receiving them by "subscribe" from the third party server 130. Note that the presence-in-range notification destination for the "subscribe" from the third party server 130 is not necessarily the server that has sent the "subscribe", but may instead be another server of the same third party.

Note that the user unique temporary ID generated by the ID generation/management/response unit 127 is stored in the table holding unit 128 together with its user unique ID, a user unique temporary ID(s) generated for another third party server(s), an IP address(es) currently dispensed to a terminal(s), and an IP address(es) that was dispensed to a terminal(s) in the past.

Examples of conceivable methods for generating a user unique temporary ID include a method in which the character string of IMSI information or the like held by the terminal 110 is combined with that of the IP address of a third party server to which the ID is to be provided and then a hash value is calculated therefrom. However, the generation means for the user unique temporary ID is not necessarily limited to this method. That is, any means which is uniform for the server and in which the 3G network information is not externally transmitted may be used.

The stored IP addresses and the generated user unique temporary IDs are stored, for example, in the format shown in FIG. 3 in the table holding unit 128. Note that the storage format for the IDs is not limited to this example. That is, any storage format by which the third party server 130 can respond with an ID that is unique and valid in the third party server 130 or in a group of third party servers of a given third party when the third party server 130 makes an inquiry by using the IP address of the terminal 110 may be used.

Next, the table held by the table holding unit 128 shown in FIG. 3 is explained in detail.

In the table holding unit 128, user unique IDs are held in a column indicated by a numeral 901. For one terminal 110, there are the same number of entries as the number of third parties at maximum. For each user unique ID, a user unique temporary ID that is assigned to each third party is managed by using the user unique ID as a key (902). Note that even after the terminal 110 moves out of the range, the user unique temporary ID is managed as an ID that does not change even when the IP address dispensed to the terminal 110 changes. In a column indicated by a numeral 903, IP addresses that have been dispensed to terminals 110 located in the range of the compact base station 120 by the compact base station 120 at that moment are recorded. In columns indicated by numerals 904 and 905, IDs that are possessed by third party servers 130 located in the same LAN as that of the compact base station 120 or IDs of third parties serving as management entities and IP addresses of the third party servers 130, respectively, are recorded.

Note that entries that are not used for a certain period may be transferred from the compact base station 120 to another server, so that the size of the aforementioned table stored in the table holding unit 128 of the compact base station 120 may be reduced.

Further, the table holding unit 128 does not necessarily have to be provided in every compact base station 120. Tables managed by the table holding units 128 of a plurality of individual compact base stations 120 may be collectively stored and managed in a different server(s).

Next, an operation of the present invention is explained with reference to a sequence diagram shown in FIG. 4. A terminal a 110 performs a presence-in-range/connection process for the mobile network management node group 150 through the compact base station 120 (step S501). The mobile network management node group 150 sends back a presence-in-range/connection process response to the terminal a 110 through the compact base station 120 (step S502).

The compact base station 120 acquires a user unique ID of the terminal a 110 when the compact base station 120 relays the presence-in-range/connection process response from the mobile network management node group 150 to that terminal a 110 (step S503). Specifically, the ID generation/management/response unit 127 of the compact base station 120 performs this user unique ID acquisition process.

The compact base station 120 generates a user unique temporary ID of the terminal a 110 relating to the user unique ID acquired in the step S503 (step S504). Specifically, the ID generation/management/response unit 127 of the compact base station 120 generates the user unique temporary ID and stores the generated user unique temporary ID together with the already-acquired user unique ID in an associated state in the table holding unit 128.

A numeral 1001 in FIG. 4 indicates information that is held in the table holding unit 128 of the compact base station 120 at this stage. At this stage, the user unique ID acquired in the step S503 and the user unique temporary ID generated in the step S504 are stored in an associated state in the internal table holding unit 128.

After that, when the terminal a 110 needs to connect to the network on the LAN side, the terminal a 110 issues a request for connection to the LAN-side network to the compact base station 120 (step S505). Note that the timing at which this LAN-side connection request is issued may be any given timing after the terminal a 110 issued the connection request to the mobile network management node group 150.

Upon receiving this connection request, the compact base station 120 dispenses an IP address available on the LAN-side network to the terminal a 110 (step S506), and notifies the terminal a 110 of the dispensed IP address by responding to the terminal a 110 (step S507).

Further, the IP address dispensed from the terminal IP address dispensing unit 122 to the terminal a 110 in the step S506 is associated with the already-held user unique ID and the user unique temporary ID in the ID generation/management/response unit 127 (step S508). That is, the ID generation/management/response unit 127 further associates the IP address, which is dispensed by the terminal IP address dispensing unit 122 based on the LAN-side connection request from the terminal a 110, with the user unique ID and the user unique temporary ID that are already held for the terminal a 110, and stores them in an associated state in the table holding unit 128.

A numeral 1002 in FIG. 4 indicates information that is held in the table holding unit 128 of the compact base station 120 at this stage. It shows a state at this stage where the IP address newly dispensed in the step S506 is further associated with the user unique ID and the user unique temporary ID that are already stored in or before the step 504.

Next, the terminal a 110 requests data from the third party server 130 connected to the LAN-side network through the compact base station 120 (step S509). The data request transmitted from the terminal a 110 is a request whose transmission source address is the IP address dispensed in the step S506. In the compact base station 120, the data request, which is transmitted from the terminal a 110 and received by the terminal communication unit 121, is sent to the LAN communication unit 124. Then, the data request is sent from that LAN communication unit 124 to the third party server 130.

Upon receiving the data request, the third party server 130 detects the address of the terminal from the transmission source address of the packet(s) and uses the detected address as a temporary ID of the terminal (step S510). At this stage, the only information about the terminal a 110 possessed by the third party server 130 is the IP address of that terminal a 110 as shown in the numeral 1003.

Next, the third party server 130 requests a terminal ID to the compact base station 120 (step S511). This terminal ID request includes the IP address of the terminal relating to the data request detected in the step S510 as key information.

The compact base station 120 converts the IP address included in this terminal ID request into a terminal ID based on the received terminal ID request (step S512). Specifically, the ID generation/management/response unit 127 of the compact base station 120 extracts a user unique temporary ID associated with the aforementioned IP address included in the terminal ID request received from the LAN communication unit 124.

In other words, the ID generation/management/response unit 127 dispenses the user unique temporary ID that does not change even when the IP address of the terminal changes and is available only for the third party server 130, instead of dispensing the terminal IP address that could change every time the connection is reestablished, to that third party server 130 as the terminal ID.

Note that at this stage, in the compact base station 120, the ID of the third party server 130 to which the user unique temporary ID is assigned is also associated with the user unique ID, the user unique temporary ID, and the IP address.

The compact base station 120 responds to the above-described terminal ID request while incorporating the user unique temporary ID, which is converted and dispensed in the step S512, into the response (step S513). That is, the compact base station 120 notifies the third party server 130 of the user unique temporary ID as the terminal ID of the terminal a 110.

The third party server 130 ties the IP address of the terminal a 110 received in the step S509 with the user unique temporary ID of the terminal a 110 received in the step S513 (step S514). That is, the third party server 130 stores the newly-notified user unique temporary ID of the terminal a 110 together with the IP address of that terminal a 110, which was received and stored in the step S509, in an associated state in the internal storage unit. At this stage, the third party server 130 holds the IP address and the user unique temporary ID in the tied state as shown in the numeral 1004.

After that, the third party server 130 sends a response to the data request issued in the step S509 to the terminal a 110 through the compact base station 120 by using the user unique temporary ID, which is the terminal ID (step S515).

Note that in the above-described operation, a case where the ID generation/management/response unit 127 of the compact base station 120 generates a user unique temporary ID for the terminal a 110 relating to the user unique ID in the step S503 is explained. However, the ID generation/management/response unit 127 may generate a plurality of user unique temporary IDs in this step. Then, when the ID generation/management/response unit 127 dispenses the user unique temporary ID of the terminal a 110 to the third party server 130 in the step S512, the ID generation/management/response unit 127 may select and dispense one of the plurality of generated user unique temporary IDs. With this configuration, it is possible to easily assign a different user unique temporary ID of the same terminal for each third party server 130.

Further, in the above explanation, a case where the compact base station 120 acquires the IMSI, which is the user unique ID, from the presence-in-range/connection process response notified from the mobile network management node group 150 in the step S502 is explained. However, the present invention is not limited to this example case. The compact base station 120 may instead acquire the IMSI, which is the user unique ID, from the presence-in-range/connection process request transmitted from the terminal a 110 in the step S501. In this case, the order of the step S502 and the steps S503 and S504 is reversed.

Note that in the above explanation, a case where the compact base station 120 directly connects to the third party server 130 by the traffic offloading is explained as the Internet connection from the terminal a 110. However, the present invention is not limited to this example case. The compact base station 120 may instead, upon the reception of the data request from the terminal a 110, connect to the third party server 130 by using the main route through the mobile network management node group 150.

As described above, the base station apparatus according to the first exemplary embodiment is a base station apparatus that is able to set a plurality of routes for communication from a terminal(s) under management of the base station apparatus and includes means for sending back an ID relating to a terminal located in its range in response to an external ID request. That is, the base station apparatus includes means for notifying an external server of an ID relating to the terminal based on the presence of the terminal in its range.

According to the configuration of the first exemplary embodiment, a user unique temporary ID is generated from a user unique ID in the base station apparatus and a third party server, which is an external apparatus, is notified thereof. As a result, it is possible to ensure the uniqueness for the user as in the case of the user unique ID.

Further, the user unique temporary ID, which is generated by the base station apparatus based on the user unique ID, is a unique ID within the third party or the third party server(s). Therefore, even if it is leaked, the extent of the damage could be confined within that third party.

That is, the user unique IDs typified by the IMSIs are used for billing users by the operators and hence are highly confidential. Therefore, if they are leaked to outsiders, they could be used for the wrong purposes. Therefore, the use of those user unique IDs outside the mobile networks is not desirable in view of the aforementioned leakage. In contrast to this, according to the present invention, an ID that is different from such a highly confidential user unique ID and capable of uniquely identifying the terminal is generated based on that user unique ID in the compact base station. Further, different IDs are used for different third parties. Therefore, the extent of the leakage damage can be confined within the third party.

Further, according to the first exemplary embodiment, the IP providing means for providing an ID to a third party does not depend on the protocol specifications. Therefore, it is possible to construct the means for acquiring a unique terminal ID in a third party server irrespective of the type of application.

Figure 5:
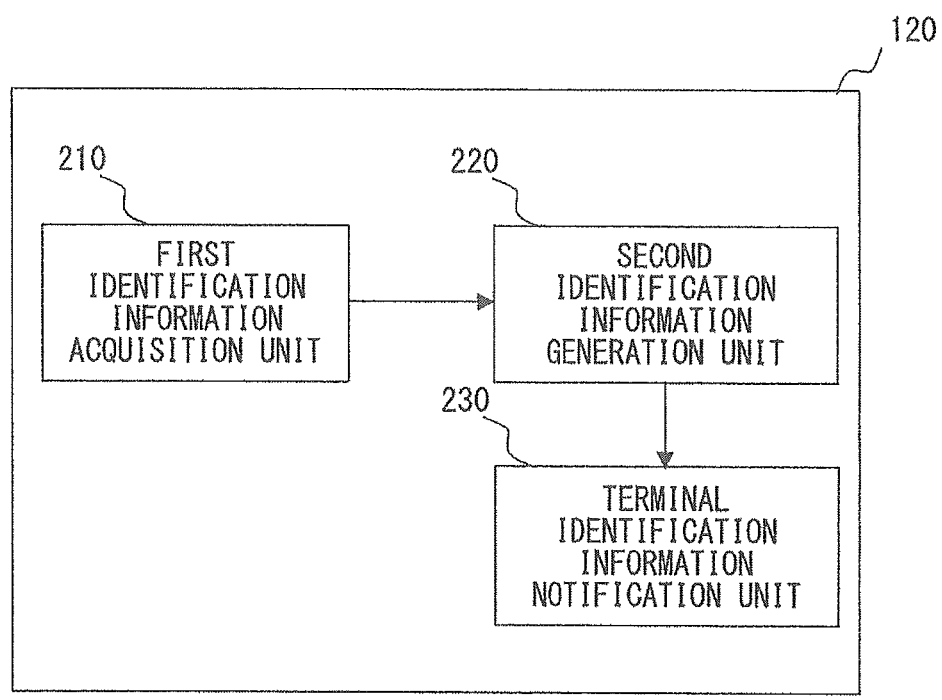
FIG. 5 is a block diagram showing a configuration of a compact base station apparatus according to the first exemplary embodiment.

Note that when the above-described compact base station 120 is expressed from a different view point, the compact base station 120 could be expressed by functional blocks shown in FIG. 5. In FIG. 5, the compact base station 120 includes a first identification information acquisition unit 210, a second identification information generation unit 220, and a terminal identification information notification unit 230. Note that these three functional blocks correspond to the ID generation/management/response unit 127 shown in FIG. 2, respectively.

The first identification information acquisition unit 210 acquires first identification information for identifying a terminal that is under management of the own base station. Specifically, the first identification information corresponds to the above-described user unique ID and could be an IMSI or a TMSI. As described above, the first identification information is identification information for uniquely identifying a terminal in a mobile network. That is, the first identification information is identification information by which each base station identifies a terminal(s) in a common fashion in a mobile network including a plurality of base stations.

The second identification information generation unit 220 generates second identification information associated with the first identification information acquired by the first identification information acquisition unit 210. The second identification information corresponds to the above-described user unique temporary ID.

The second identification information is identification information for uniquely identifying a terminal in a local area network that is different from the aforementioned mobile network. The second identification information is identification information for uniquely identifying a terminal between the base station included in the local area network and a third party server(s), which is an external apparatus that provides a service(s). Therefore, when two or more external apparatuses are included in the local area network, a plurality of second identification information pieces are generated in such a manner that one second identification information piece is generated between the base station and one external apparatus.

Therefore, second identification information for identifying a certain terminal that is possessed in common by the base station and one external apparatus is different from anther second identification information for identifying that certain terminal that is possessed in common by the base station and another external apparatus. That is, although the second identification information is information for uniquely identifying a certain terminal between the base station and an external apparatus, different second identification information is used for uniquely identifying that certain terminal between the base station and a different external apparatus.

As described above, each second identification information piece for identifying a certain terminal is an identification information piece that is valid only between the base station and an external apparatus. However, when a plurality of external apparatuses (third party servers) collectively form a group of external apparatuses (third party server group), the second identification information can serve as identification information for identifying the certain terminal between the base station and that external apparatus group. In this case, each external apparatus included in the same external apparatus group possesses the second identification information in common as information for uniquely identifying the certain terminal.

Further, second identification information for identifying a certain terminal that is set between one external apparatus and the base station is different from second identification information for identifying that certain terminal that is set between that external apparatus and a different base station apparatus. As described above, the second identification information is information for identifying a terminal between an external apparatus and the base station. Therefore, the second identification information generation means for generating the second identification information in the base station preferably generates the second identification information based on the first identification information for identifying that terminal and external apparatus identification information for identifying that external apparatus. By adopting the above-described generation method, the base station can generate different second identification information for each terminal and for each external apparatus. Note that the IP address of the external apparatus may be used as the above-described external apparatus identification information.

In general, since the second identification information is individually generated by each base station and possessed in common between that base station and each external apparatus, the second identification information is not used in common between that external apparatus and another base station. However, it is possible to add a configuration where second identification information is possessed in common among base stations located in a certain range. However, in contrast to the first identification information, which is used in common among all the base stations included in the mobile network, the second identification information is limited to those that are possessed in common in a limited area and/or among limited service providers.

Note that the second identification information is different from the IP address. The IP address is an address on a local area network that is temporarily assigned to a terminal that connects to the network. Therefore, when that terminal moves out from under the management of the own base station, the IP address assigned to that terminal is released and then assigned to another terminal. Further, when that terminal moves in under the management of the own base station again and attempts to connect to the network, a different IP address is assigned.

In contrast to this, the second identification information is kept and possessed in common between the base station and the external apparatus even when the terminal moves out from under the management of the own base station. Therefore, even when the terminal frequently moves out from the presence-in-range area, the terminal can be uniquely identified between the base station and the external apparatus.

The terminal identification information notification unit 230 notifies the external apparatus of the second identification information generated by the second identification information generation unit 220 as information for identifying the terminal. As described above, the external apparatus is an apparatus connected to the compact base station 120, such as a third party server, and is a service providing server that provide a service(s) in response to a request from the terminal.

As described above, the compact base station 120 intervenes between a terminal under management thereof and an external apparatus, generates a user unique ID, and notifies the external apparatus of the generated user unique ID. As a result, it is possible to manage services without using the highly confidential user unique ID.

Figure 6:
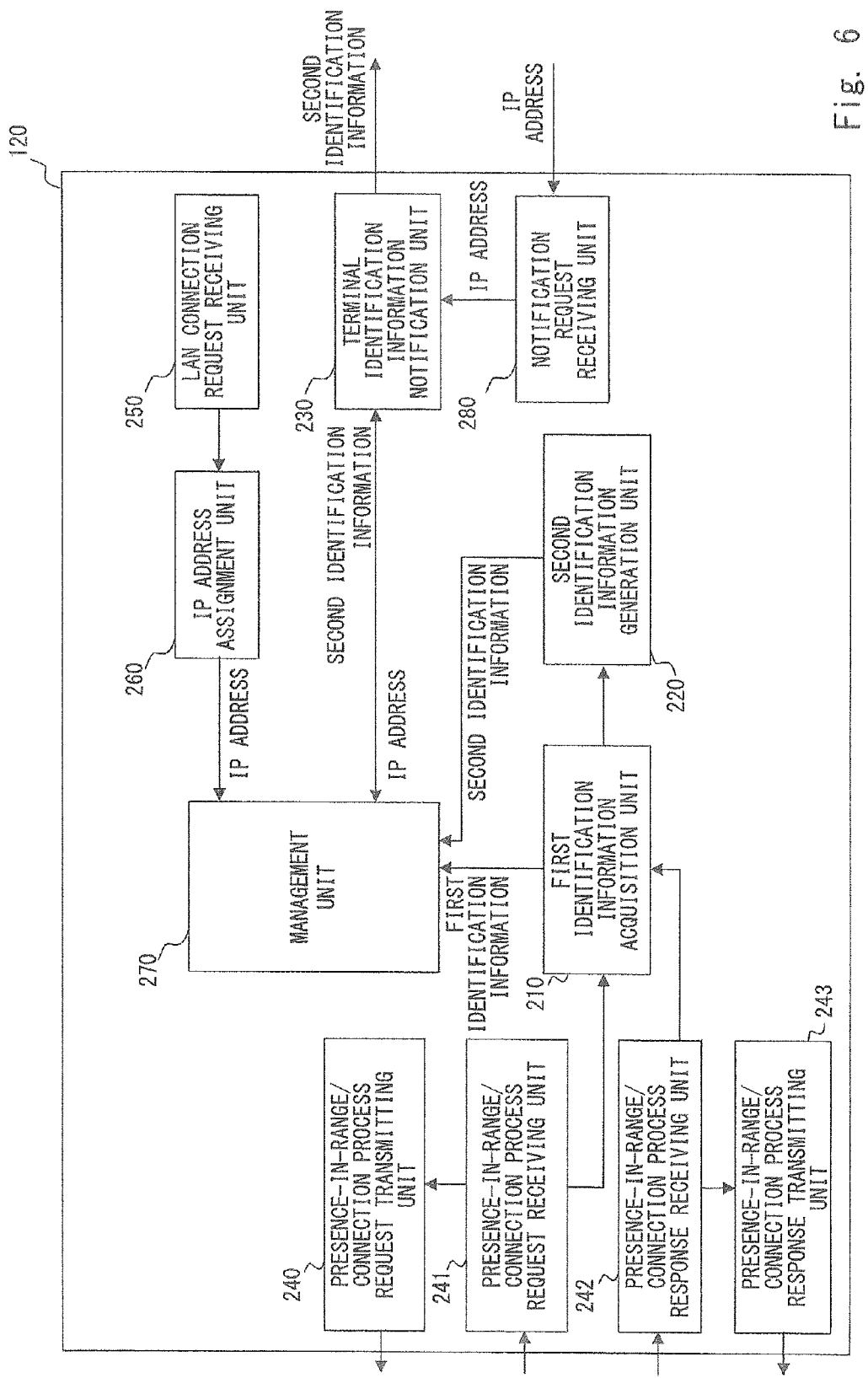
FIG. 6 is a block diagram showing a configuration of a compact base station apparatus according to the first exemplary embodiment.

Further, when the above-explained compact base station 120 is expressed from a different view point in a more specific manner, the compact base station 120 could be expressed by functional blocks shown in FIG. 6. In FIG. 6, the compact base station 120 includes, in addition to the first identification information acquisition unit 210, the second identification information generation unit 220, and the terminal identification information notification unit 230, a presence-in-range/connection process request receiving unit 240, a presence-in-range/connection process request transmitting unit 241, a presence-in-range/connection process response receiving unit 242, a presence-in-range/connection process response transmitting unit 243, a LAN connection request receiving unit 250, an IP address assignment unit 260, a management unit 270, and a notification request receiving unit 280.

The presence-in-range/connection process request receiving unit 240 and the presence-in-range/connection process response transmitting unit 243 in FIG. 6 correspond to the terminal communication unit 121 in FIG. 2, and the presence-in-range/connection process request transmitting unit 241 and the presence-in-range/connection process response receiving unit 242 in FIG. 6 correspond to the core network communication unit 123 in FIG. 2. Further, the LAN connection request receiving unit 250 and the notification request receiving unit 280 correspond to the LAN communication unit 124, and the IP address assignment unit 260 corresponds to the terminal IP address dispensing unit 122. Further, the first identification information acquisition unit 210, the second identification information generation unit 220, and the management unit 270 correspond to the ID generation/management/response unit 127, respectively.

The presence-in-range/connection process request receiving unit 240 receives a presence-in-range/connection process request including first identification information transmitted from a terminal under management of the own base station. This presence-in-range/connection process request is sent to the presence-in-range/connection process request transmitting unit 241.

The presence-in-range/connection process request transmitting unit 241 transmits the presence-in-range/connection process request to a mobile network management node, which is an external host apparatus (host node).

The presence-in-range/connection process response receiving unit 242 receives a presence-in-range/connection process response including the first identification information transmitted from the aforementioned mobile network management node, i.e., the host apparatus. The presence-in-range/connection process response is a response to the aforementioned presence-in-range/connection process request. This presence-in-range/connection process response is sent to the presence-in-range/connection process response transmitting unit 243.

The presence-in-range/connection process response transmitting unit 243 transmits the presence-in-range/connection process response to the terminal.

Note that the first identification information acquisition unit 210 can acquire the first identification information from the presence-in-range/connection process request received by the presence-in-range/connection process request receiving unit 240. Further, the first identification information acquisition unit 210 can acquire the first identification information from the presence-in-range/connection process response received by the presence-in-range/connection process response receiving unit 242. Since the user unique ID such as the IMSI is included in those connection processes, that ID can be used as the first identification information.

The second identification information generation unit 220 generates second identification information based on the first identification information acquired by the first identification information acquisition unit 210. The second identification information generated by the second identification information generation unit 220 is temporarily sent to the management unit 270 and then the terminal identification information notification unit 230 notifies the external apparatus thereof.

The LAN connection request receiving unit 250 receives a LAN connection request, which is a request for connection to a LAN, from a terminal under management of the own base station. The LAN connection request receiving unit 250 sends the received LAN connection request to the IP address assignment unit 260.

The IP address assignment unit 260 assigns an IP address to the terminal. Note that the IP address assignment unit 260 assigns the IP address to the terminal that has issued that LAN connection request based on the LAN connection request received by the LAN connection request receiving unit 250.

The management unit 270 manages the first identification information, the second identification information, and the IP address in a state where they are associated with each other. A management table in which those associations are organized is stored in an internal storage unit (table holding unit) of the compact base station 120, so that the above-described plurality of identification information pieces are managed.

The notification request receiving unit 280 receives a notification request for information for uniquely identifying a terminal under management of the compact base station 120 from an external apparatus, which is a third party server or the like. The notification request receiving unit 280 sends the received notification request to the terminal identification information notification unit 230. This notification request includes an IP address of the terminal.

Upon receiving the notification request received by the notification request receiving unit 280, the terminal identification information notification unit 230 sends the IP address included in that notification request as search key information to the management unit 270. Then, the terminal identification information notification unit 230 receives the second identification information of that terminal that is stored together with that IP address in an associated state in the management unit 270. The terminal identification information notification unit 230 notifies the aforementioned external apparatus of the second identification information of the terminal received from the management unit 270 by using the aforementioned IP address of the terminal as a key.

As has been explained so far, in this exemplary embodiment, the compact base station is located on the route between a cellular network and a LAN network. Further, the compact base station can provide an ID that is equivalent to the unique ID used in the cellular network to a server on the LAN side. Further, since the dispensing of an IP address and the dispensing of an ID to a terminal under management of a given compact base station are always performed in the same node, the correspondence relation between the IP address and the ID can be maintained. As a result, it is possible to send back the same ID in response to an inquiry from a third party server using an IP address as a key even when the IP address dispensed to the same terminal is changed.

Figure 7:
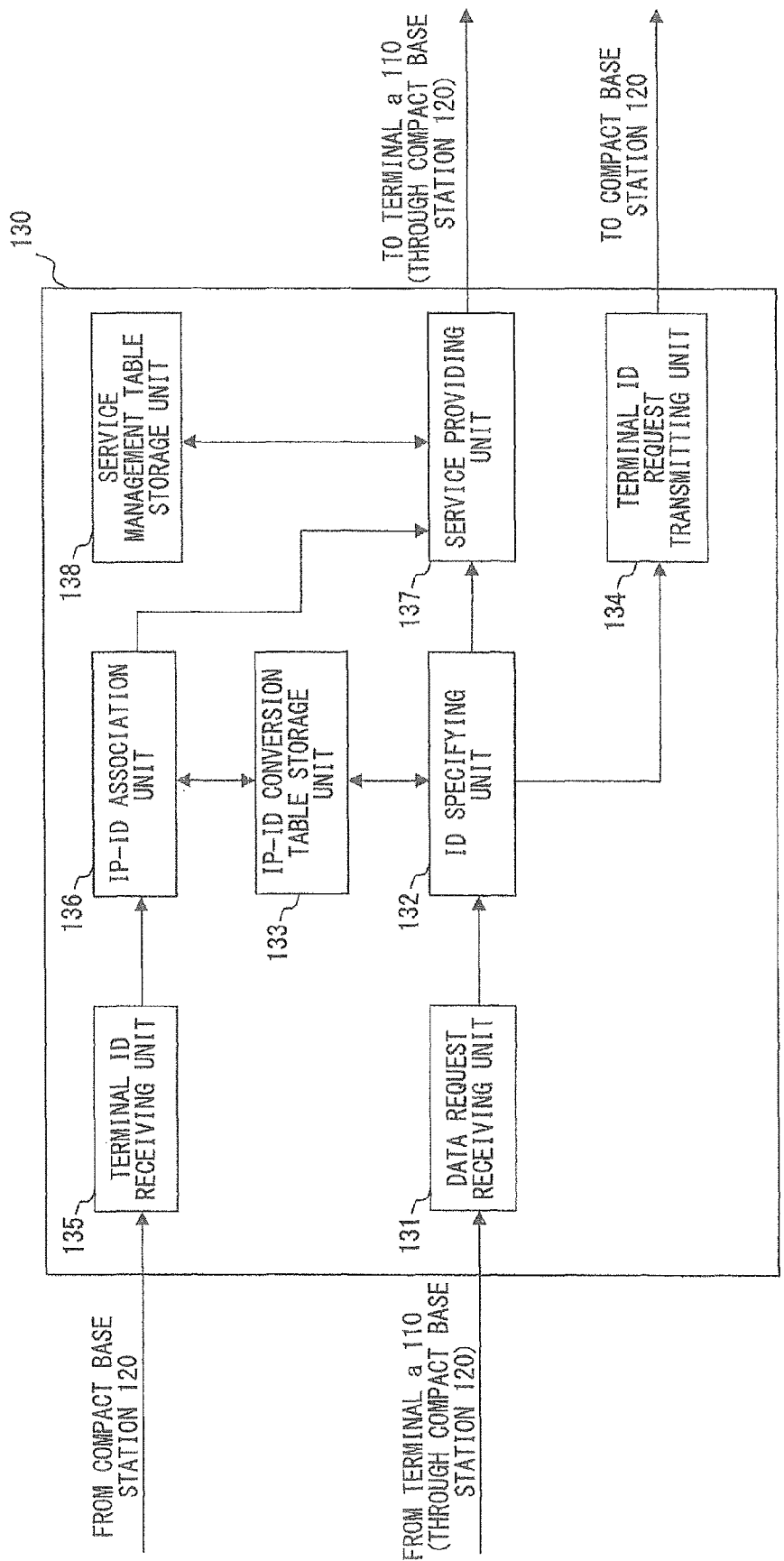
FIG. 7 is a block diagram showing a configuration of a third party server according to the first exemplary embodiment.

FIG. 7 shows an example of a configuration of the third party server 130 according to the first exemplary embodiment. The third party server 130 includes a data request receiving unit 131, a terminal ID specifying unit 132, an IP-ID conversion table storage unit 133, a terminal ID request transmitting unit 134, a terminal ID receiving unit 135, an IP-ID association unit 136, a service providing unit 137, and a service management table storage unit 138.

The data request receiving unit 131 receives a data request transmitted from a terminal a 110 through the compact base station 120. This data request includes an IP address of the terminal a 110. The data request receiving unit 131 sends the received data request to the terminal ID specifying unit 132.

The terminal ID specifying unit 132 specifies the terminal ID of the terminal a 110 relating to the data request received from the data request receiving unit 131. Specifically, the terminal ID specifying unit 132 acquires an ID associated with the IP address included in the data request received from the data request receiving unit 131 by referring to an IP-ID conversion table stored in the IP-ID conversion table storage unit 133.

The terminal ID specifying unit 132 sends the IP address included in the data request received from the data request receiving unit 131 and the aforementioned specified ID to the service providing unit 137. Note that when no corresponding IP address is recorded in the aforementioned IP-ID conversion table, the terminal ID specifying unit 132 records that IP address in the IP-ID conversion table as a new entry and issues a terminal ID request instruction to the terminal ID request transmitting unit 134.

The IP-ID conversion table storage unit 133 holds the IP-ID conversion table in which associations between IP addresses and terminal IDs are organized.

The terminal ID request transmitting unit 134 transmits a terminal ID request to the compact base station 120 in accordance with the instruction from the terminal ID specifying unit 132. Note that the terminal ID request transmitting unit 134 incorporates the terminal IP address sent from the terminal ID specifying unit 132 together with the terminal ID request instruction into the terminal ID request and transmits the terminal ID request including the terminal IP address.

The terminal ID receiving unit 135 receives a response to the aforementioned terminal ID request transmitted by the terminal ID request transmitting unit 134. This response includes a terminal ID. Note that this terminal ID is the user unique temporary ID (second identification information) generated by the compact base station 120. The terminal ID receiving unit 135 sends the received terminal ID to the IP-ID association unit 136.

The IP-ID association unit 136 associates the terminal ID received from the terminal ID receiving unit 135 with the IP address of that terminal. Specifically, the IP-ID association unit 136 ties the terminal ID received from the terminal ID receiving unit 135 with the IP address of that terminal recorded in the entry in the IP-ID conversion table stored in the IP-ID conversion table storage unit 133. Further, the IP-ID association unit 136 sends the terminal ID and the IP address relating to that terminal to the service providing unit 137.

The service providing unit 137 provides a service(s) based on the terminal ID received from the IP-ID association unit 136. That is, the service providing unit 137 specifies a service(s) associated with the terminal ID by referring to a service management table which is stored in the service management table storage unit 138 and in which the associations between services and terminal IDs are organized, and provides the specified service(s). Specifically, when the data request received by the data request receiving unit 131 is an http request, the service providing unit 137 transmits an http response according to that terminal ID to the terminal a 110 through the compact base station 120.

This configuration can realize personalization for each user without depending on the protocol and minimize the influence of the ID leakage.

Second Exemplary Embodiment

A compact base station according to a second exemplary embodiment is characterized in that the generation timing of the user unique temporary ID (second identification information) is different from that in the first exemplary embodiment. The compact base station according to the second exemplary embodiment is explained hereinafter with reference to the drawings. Note that FIGS. 2 and 6 are also used for the explanation of the configuration of the compact base station according to the second exemplary embodiment. Further, the explanations of the parts that are already explained above in the first exemplary embodiment are partially omitted.

Figure 8:
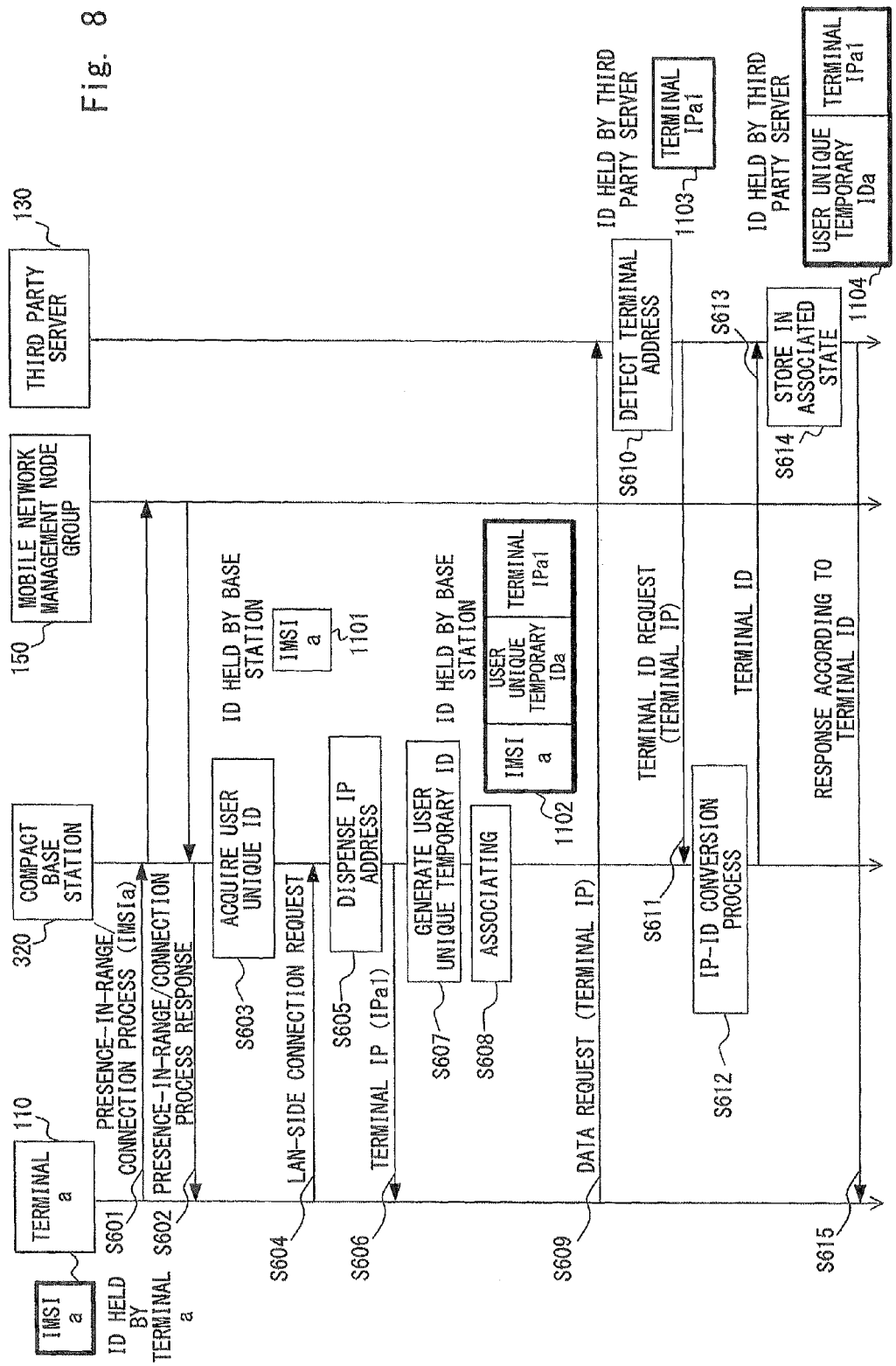
FIG. 8 is a sequence diagram showing an operation flow of a communication system according to a second exemplary embodiment.

FIG. 8 is a sequence diagram showing an operation of a communication system according to the second exemplary embodiment. Note that steps S601 to S603 and steps S609 to S615 in FIG. 8 are roughly the same as the steps S501 to S503 and steps S509 to S515, respectively, in FIG. 4. Therefore, their explanations are omitted.

When the compact base station 320 according to the second exemplary embodiment receives a request for connection to an LAN-side network issued from a terminal a 110 (step S604), the compact base station 320 dispenses an IP address available on the LAN-side network (step S605) and notifies the terminal a 110 of the dispensed IP address (step S606).

After dispensing the IP address to the terminal a 110, the compact base station 320 generates a user unique temporary ID for the terminal a 110 (step S607). Specifically, the ID generation/management/response unit 127 of the compact base station 320 generates the user unique temporary ID.

The ID generation/management/response unit 127 associates the user unique temporary ID generated in the step S607 with the user unique ID already acquired in the step S603 and the IP address dispensed in the step S605, and stores them in the associated state in the table holding unit 128.

That is, as shown in a numeral 1102 in FIG. 8, at this stage, the IMSI of the terminal a 110, which is the user unique ID, the user unique temporary ID generated for the terminal a 110, and the IP address assigned to the terminal 110 are stored in an associated state in the table holding unit 128.

As described above, according to the second exemplary embodiment, the compact base station waits for a LAN-side connection request issued from the terminal and then generates a user unique temporary ID for that terminal in response to the request. The actual occasion on which the user unique temporary ID is required is when access from the terminal side to the LAN side occurs. Therefore, even if the user unique temporary ID is generated after waiting for this access, the user unique temporary ID can be assigned in response to the request from the third party server. Therefore, in a step S614 in FIG. 8, the IP address of the terminal and the user unique temporary ID assigned to that terminal can be stored in an associated state as shown in the numeral 1104.

Note that the ID generation/management/response unit 127 may be configured so as to generate the same number of user unique temporary IDs as the number of third party servers 130 connected to the own base station 320.

Third Exemplary Embodiment

A compact base station according to a third exemplary embodiment is characterized in that the generation timing of the user unique temporary ID (second identification information) is different from those in the first and second exemplary embodiments. The compact base station according to the third exemplary embodiment is explained hereinafter with reference to the drawings. Note that FIGS. 2 and 6 are also used for the explanation of the configuration of the compact base station according to the third exemplary embodiment. Further, the explanations of the parts that are already explained above in the first and second exemplary embodiments are partially omitted.

Figure 9:
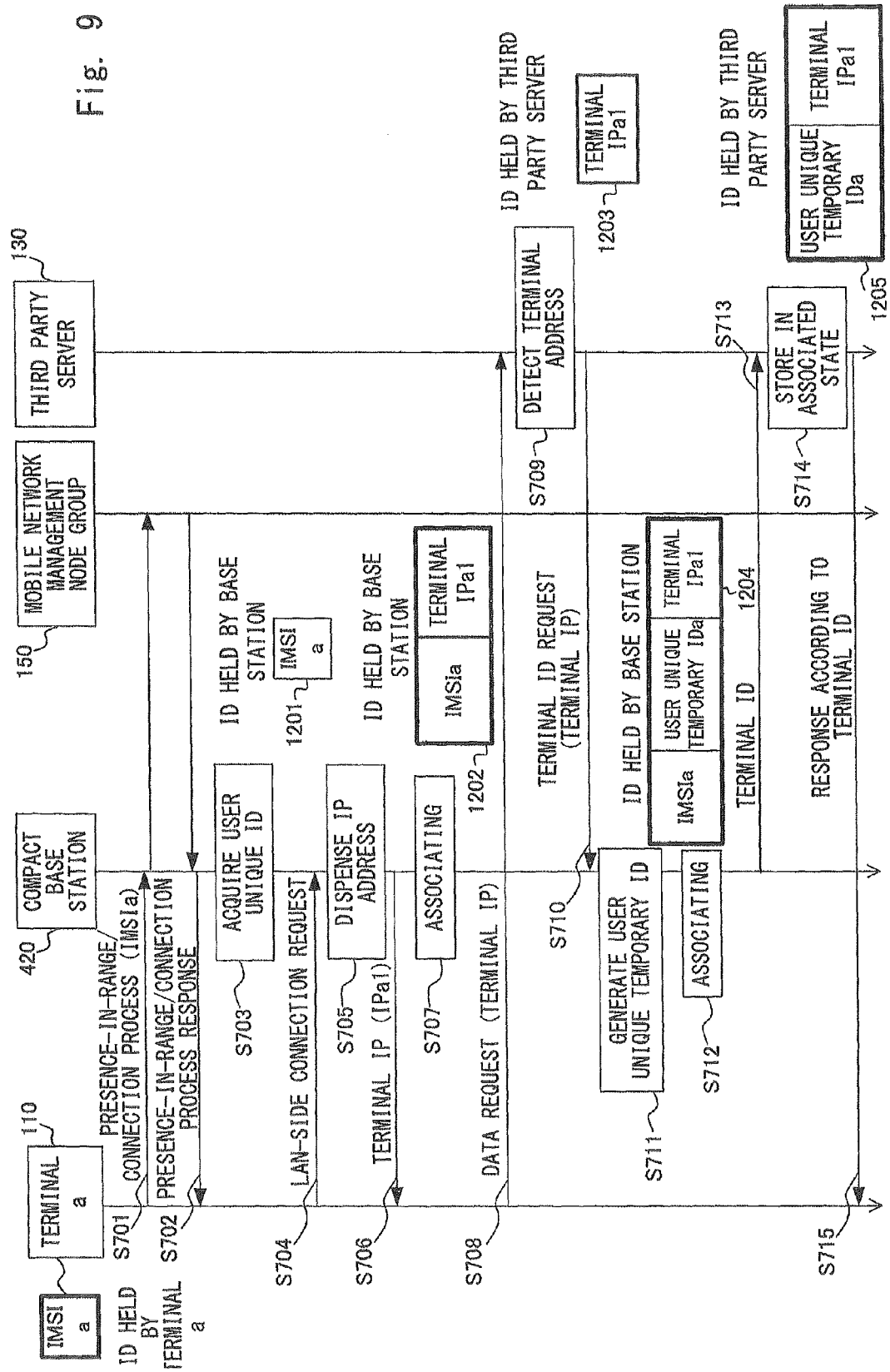
FIG. 9 is a sequence diagram showing an operation flow of a communication system according to a third exemplary embodiment.

FIG. 9 is a sequence diagram showing an operation of a communication system according to the third exemplary embodiment. Note that steps S701 to S706 and steps S708 to S710 in FIG. 9 are roughly the same as the steps S601 to S606 and steps S609 to S611, respectively, in FIG. 8. Therefore, their explanations are omitted.

The compact base station 420 according to the third exemplary embodiment associates the IP address dispensed for the terminal a 110 in the step S705 with the user unique ID acquired in the step S703 and stores them in the associated state (step S707). In this state, each identification information piece stored in the table holding unit 128 of the compact base station 420 is stored as shown in the numeral 1202.

When the compact base station 420 receives a terminal ID request from the third party server 130 in a step S710, the compact base station 420 generates a user unique temporary ID for the terminal a 110 relating to that terminal ID request (step S711). Next, the compact base station 420 associates the user unique ID of that terminal a 110, the user unique temporary ID of the terminal a 110, and the IP address assigned to the terminal a 110 with each other, and stores them in the associated state as shown in the numeral 1204 (step S712).

Next, the compact base station 420 transmits the user unique temporary ID of the terminal a 110, which was generated for the third party server 130 based on the terminal ID request from that third party server 130 in the step S710, to that third party server 130 (step S713). The third party server 130 associates this transmitted user unique temporary ID with the IP address and stores them in the associated state as shown in the numeral 1205 (step S714). After that, the third party server 130 responds according to that user unique temporary ID (step S715).

As described above, according to the third exemplary embodiment, the compact base station generates a user unique temporary ID for the terminal based on a terminal ID request from the third party server 130. It is also possible to assign a user unique temporary ID at the above-described timing.

Fourth Exemplary Embodiment

A compact base station according to a fourth exemplary embodiment is characterized in that the generation timing of the user unique temporary ID (second identification information) is different from those in the first to third exemplary embodiments. The compact base station according to the fourth exemplary embodiment is explained hereinafter with reference to the drawings. Note that the explanations of the parts that are explained above in the first to third exemplary embodiments are partially omitted for the clarification of the invention.

Figure 10:
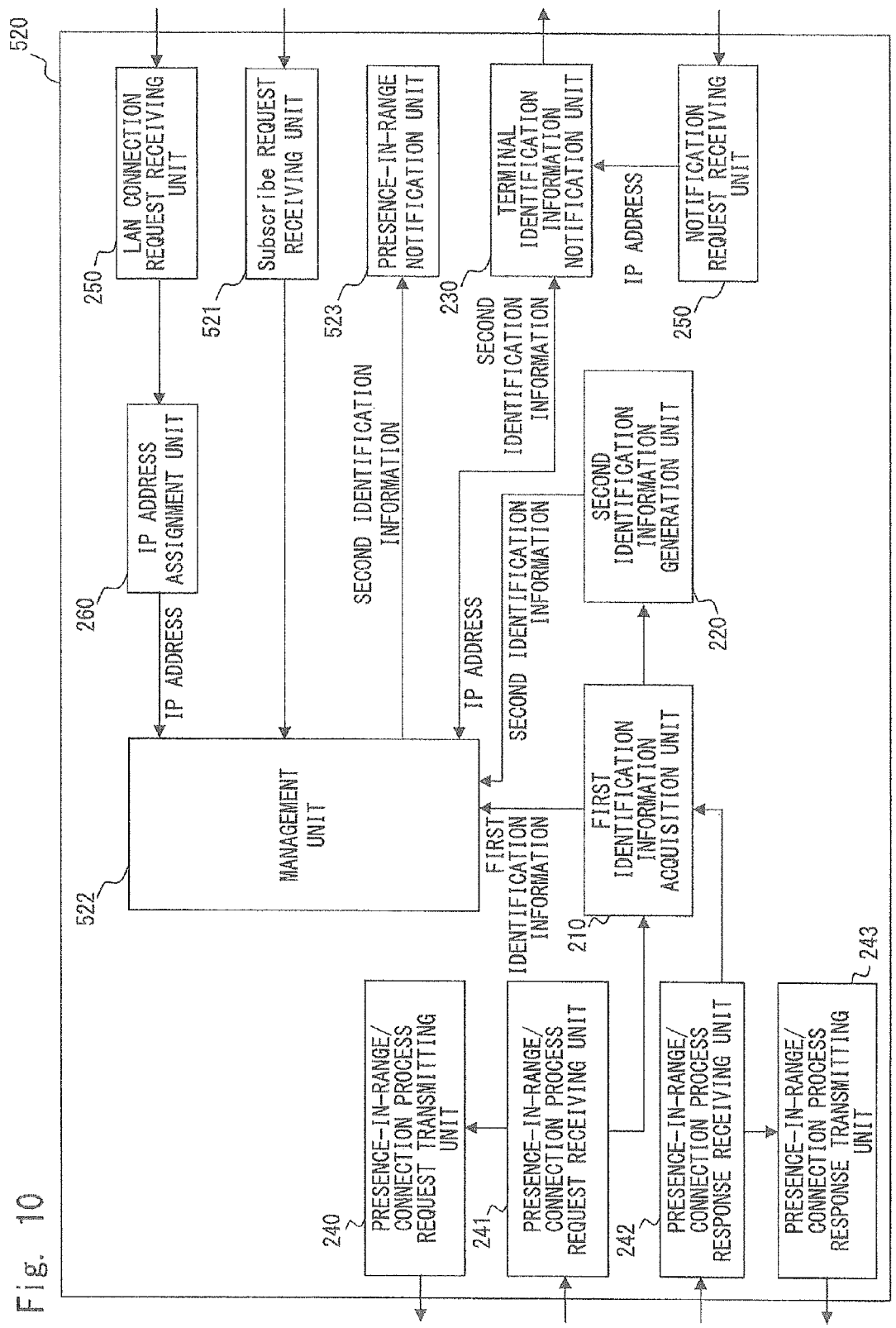
FIG. 10 is a block diagram showing a configuration of a compact base station apparatus according to a fourth exemplary embodiment.

FIG. 10 is a block diagram showing a configuration of a compact base station 520 according to the fourth exemplary embodiment. The compact base station 520 includes a first identification information acquisition unit 210, a second identification information generation unit 220, a terminal identification information notification unit 230, a presence-in-range/connection process request receiving unit 240, a presence-in-range/connection process request transmitting unit 241, a presence-in-range/connection process response receiving unit 242, a presence-in-range/connection process response transmitting unit 243, a LAN connection request receiving unit 250, an IP address assignment unit 260, a notification request receiving unit 280, a Subscribe request receiving unit 521, a management unit 522, and a presence-in-range notification unit 523.

The Subscribe request receiving unit 521 receives a Subscribe request from the third party server 530. Note that the Subscribe request is a request that is issued from a third party server that wants to receive a presence-in-range notification in order to make a compact base station 520 perform the registration process of the third party server itself in advance, so that the compact base station 520 performs the so-called Subscribe process, which is a process performed in order to make the compact base station notify the third party server of an ID relating to a terminal or a terminal user when the terminal enters the range of the compact base station. This Subscribe request includes server identification information for identifying the third party server that has issued the request. Note that the unique ID or the IP address of the third party server can be used as the server identification information.

The Subscribe request receiving unit 521 instructs the management unit 522 to perform a Subscribe process when the Subscribe request receiving unit 521 receives a Subscribe request.

The management unit 522 performs the Subscribe process. Specifically, when the management unit 522 receives a Subscribe process implementation instruction from the Subscribe request receiving unit 521, the management unit 522 stores the aforementioned server identification information included in that Subscribe request as information for identifying the server for which the Subscribe process is to be performed in an internal storage unit. Then, when the first identification information acquisition unit 210 acquires the first identification information, the management unit 522 sends second identification information generated by the second identification information generation unit 220 to the presence-in-range notification unit 523.

Further, the management unit 522 manages the first identification information acquired by the first identification information acquisition unit 210, the second identification information generated by the second identification information generation unit 220, the IP address assigned by the IP address assignment unit 260, and the server identification information received by the Subscribe request receiving unit 521 in a state where they are associated with each other. A management table in which those associations are organized is stored in an internal storage unit (table holding unit) of the compact base station 520, so that the above-described plurality of identification information pieces are managed as shown in FIG. 3.

The presence-in-range notification unit 523 sends a presence-in-range notification including second identification information, which is sent based on the Subscribe process performed by the management unit 522, to the third party server 530.

Figure 11:
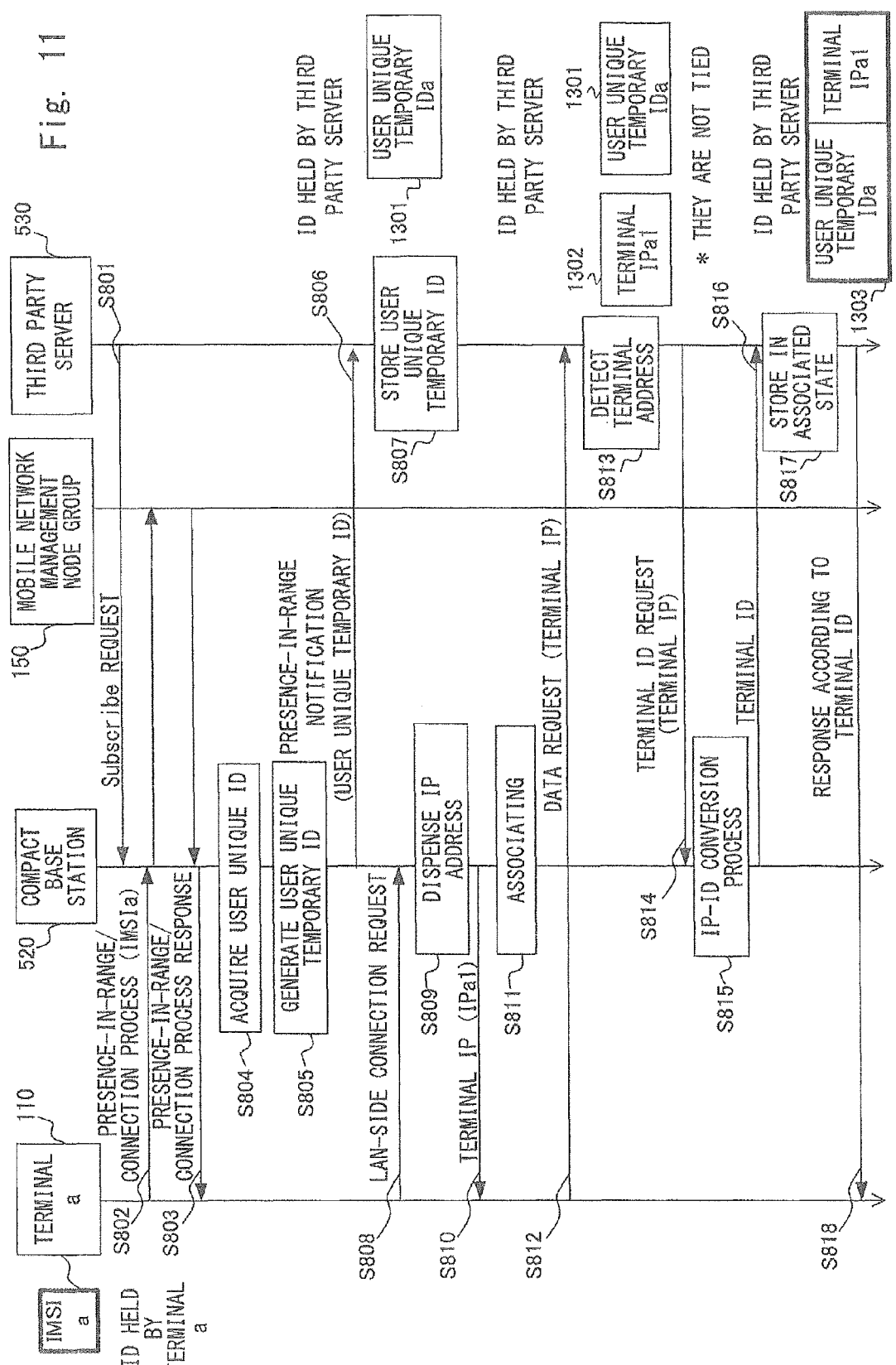
FIG. 11 is a sequence diagram showing an operation flow of a communication system according to the fourth exemplary embodiment.

Next, an operation flow of the communication system according to the fourth exemplary embodiment is explained with reference to a sequence diagram shown in FIG. 11.

The third party server 530 transmits a subscribe request to the compact base station 520 in order to make the compact base station 520 perform a subscribe process in advance so that the compact base station 520 sends a presence-in-range notification to the third party server 530 (step S801). Note that the subscribe process is performed in advance so that the third party server 530 receives a presence-in-range notification from the compact base station 520. By this subscribe process, the third party server 530 gets ready for receiving a presence-in-range notification from the compact base station 520.

The terminal a 110 performs a presence-in-range/connection process for the mobile network management node group 150 through the compact base station 520 (step S802). The mobile network management node group 150 sends back a presence-in-range/connection process response to the terminal a 110 through the compact base station 520 (step S803).

The compact base station 520 acquires the user unique ID of the terminal a 110 when the compact base station 520 relays the presence-in-range/connection process response from the mobile network management node group 150 to that terminal a 110 (step S804).

The compact base station 520 generates a user unique temporary ID for the terminal a 110 relating to the user unique ID acquired in the step S804 (step S805). Note that the compact base station 520 generates the same number of user unique temporary IDs as the number of third party servers that are already recognized through the subscribe process performed in the step S801. That is, each of the user unique temporary IDs generated by the compact base station 520 is a terminal ID unique to a respective one of the third party servers 530.

The compact base station 520 transmits each of the user unique temporary IDs generated in the step S805 together with a presence-in-range notification to a respective one of the third party servers 530 for which the subscribe process was already performed (step S806). That is, the compact base station 520 notifies the third party server 530 that the terminal a 110 has entered its range by using the user unique temporary ID, which is the terminal ID unique to that third party server. As a result, the third party server 530 can acquire the ID of the terminal a 110 irrespective of whether or not the terminal a 110 performs communication on the LAN side.

The third party server 530 stores therein the user unique temporary ID of the terminal a 110 transmitted from the compact base station 520 in the step S806 (step S807).

Note that the subscribe process performed in the step S801 is not necessarily performed before the step S802. That is, the subscribe process may be performed whenever a new third party server 530 is installed on the LAN. When a new subscribe process is performed by a new third party server 530, the compact base station 520 may generate an additional user unique temporary ID of the terminal a 110 under management of the own station for that third party server 530 and transmit the generated new user unique temporary ID to that third party server 530 together with a presence-in-range notification.

Next, the terminal a 110 issues a request for connection to the LAN-side network to the compact base station 520 (step S808). The timing at which the request for connection to the LAN-side is issued may be any given timing after the terminal a 110 issued the connection request to the mobile network management node group 150. Upon receiving this connection request, the compact base station 520 dispenses an IP address available on the LAN-side network to the terminal a 110 (step S809), and notifies the terminal 110 of this dispensed IP address (step S810).

The IP address dispensed to the terminal a 110 by the compact base station 520 is associated with the user unique ID and the user unique temporary ID (step S811). At this stage, in the compact base station 520, the ID for identifying the third party server 530 acquired in the step S801, the user unique ID of the terminal a 110 acquired in the step S804, the user unique temporary ID of the terminal a 110 for the third party server 530 generated in the step S805, and the IP address of the terminal a 110 assigned in the step S809 are associated with each other. Meanwhile, although the user unique temporary ID of the terminal a 110 has already been received and stored on the third party server 530 side at this stage, the user unique temporary ID is not associated with the other information pieces on the third party server 530 side.

Next, the terminal a 110 requests data from the third party server 530 connected to the LAN-side network through the compact base station 520 (step S812). In the third party server 530, the address of the terminal is detected from the transmission source address of the packet(s) and the detected address is used as a temporary ID of the terminal (step S813). However, in the third party server 530 at this stage, there is no association between the user unique temporary ID already acquired in the step S806 and the IP address of the terminal a 110 detected and acquired in the step S812.

Next, the third party server 530 requests a terminal ID from the compact base station 520 (step S814). The aforementioned terminal ID request, which is transmitted from the third party server 530 to the compact base station 520, includes the IP address of the terminal relating to this request.

The compact base station 520 converts the terminal IP address included in the terminal ID request sent from the third party server 530 into a user unique temporary ID based on that terminal ID request (step S815). Specifically, the compact base station 520 extracts the user unique temporary ID associated with the terminal IP address included in the aforementioned terminal ID request and the ID for identifying the third party server 530.

The compact base station 520 transmits the user unique temporary ID obtained in the step S815 to the third party server 530 (step S816). The compact base station 520 sends the user unique temporary ID that does not change even when the IP address of the terminal changes and is available only for the third party server 530, instead of sending the terminal IP address that could change every time the connection is reestablished, to the third party server 530.

Upon newly receiving the above-described user unique temporary ID, the third party server 530 ties the user unique temporary ID of the terminal, which has already been acquired by the presence-in-range notification in advance, with the IP address of the terminal relating to the data request (step S817). At this stage, the IP address and the user unique temporary ID of the terminal a 110 are stored in an associated state in the storage unit as shown by the numeral 1303. After that, the third party server 530 responds by using this user unique temporary ID (step S818).

With this configuration, it is possible to provide a service (s) by using an ID that is indirectly tied with the user without identifying the individual even when the terminal is located in the range but is not performing communication. Further, when communication starts, the ID, which has been tied with the user when a service(s) was provided in the past, can be tied with the destination address of the IP of a packet(s) that has arrived at the server through the communication by sending an inquiry to the base station about the ID.

Figure 12:
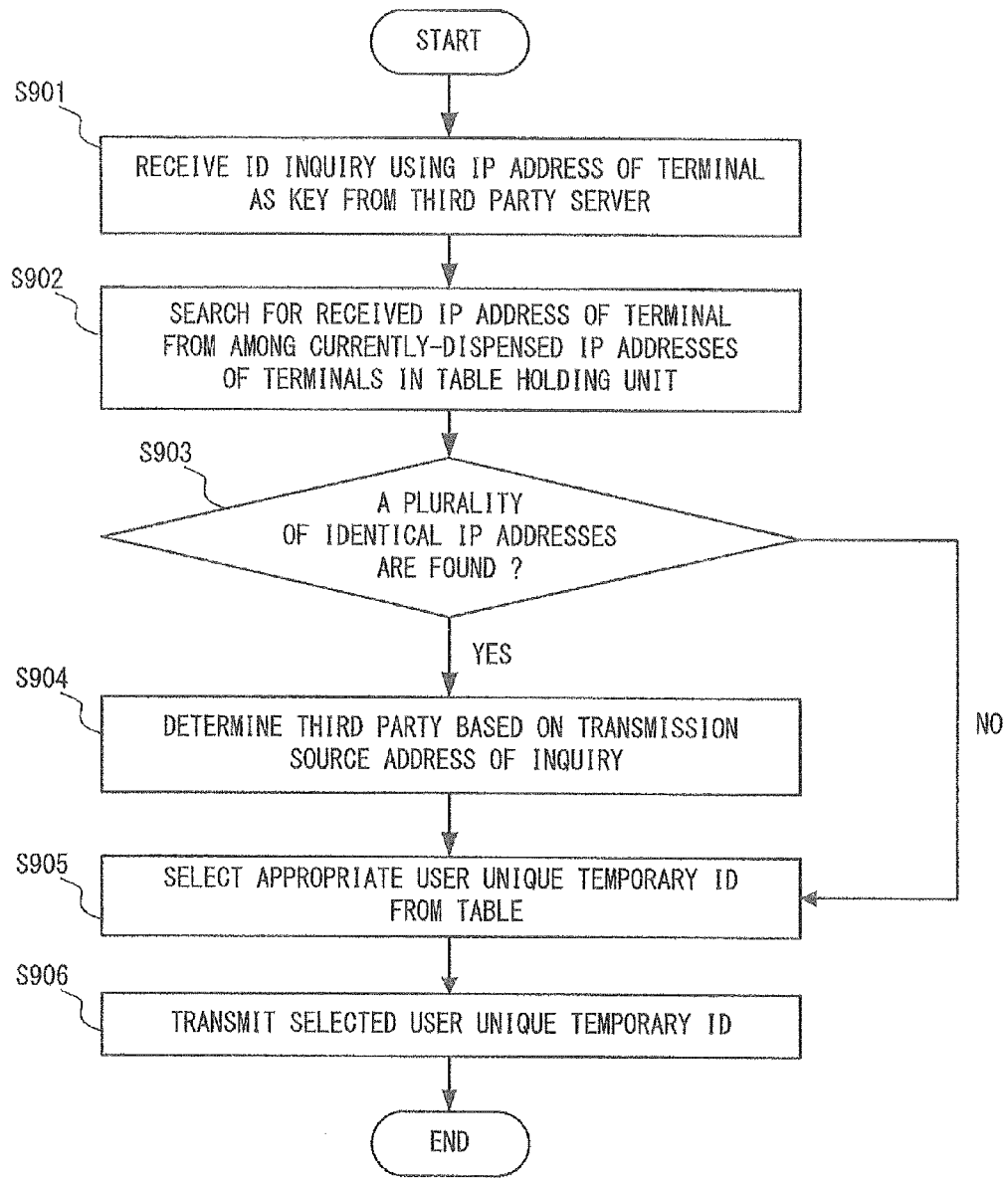
FIG. 12 is a flowchart showing an operation flow of a communication system according to the fourth exemplary embodiment.

FIG. 12 is a flowchart showing a specific operation flow of the IP-ID conversion process performed in the compact base station 520. FIG. 12 shows an operation of the compact base station 520 that is performed after LAN-side connection is established.

The compact base station 520 receives a terminal ID request, which is an ID inquiry using the IP address of the terminal as a key, from the third party server 530 (step S901). This step S901 corresponds to the step S814 in FIG. 11.

The compact base station 520, which has received the terminal ID request in the step S901, searches the table recording pairs of IP addresses and user unique temporary IDs held by the table holding unit for the IP address of the received inquiry (step S902). The compact base station 520 determines whether or not a plurality of IP addresses are obtained as a search result in the aforementioned search (step S903).

When a plurality of identical IP addresses are obtained in the determination result in the step S903 (step S903: Yes), the compact base station 520 checks the transmission source address of the terminal ID request received in the step S901 and thereby determines which third party server has issued the request (step S904).

The compact base station 520 selects an appropriate user unique temporary ID from the aforementioned table (step S905). That is, the compact base station 520 selects, from among a plurality of user unique temporary IDs respectively associated with the plurality of identical IP addresses obtained in the step S903, a user unique temporary ID that is also associated with the transmission source address of the aforementioned third party server as the user unique temporary ID of the terminal relating to the inquiry for that third party server.

Meanwhile, when only one IP address is obtained in the determination result in the step S903 (step S903: No), the compact base station 520 jumps to the step S905 and extracts the user unique temporary ID associated with the IP address obtained in the step S903 from the aforementioned table.

The compact base station 520 transmits the ID selected in the step S905 to the third party server 530 that has issued the ID inquiry as the terminal ID of the terminal relating to the inquiry (step S906).

Note that even when the number of third party servers is one and hence only one IP address is obtained in the search result, the checking process of the ID of the third party and/or the IP address of the third party server in the step S904 may be performed before performing the process in the step S905.

Further, the key that is dispensed when the number of third parties is more than one does not necessarily have to be the transmission source address of the ID inquiry. That is, the only requirement is to include information that makes it possible to identify the ID of the third party server that has issued the inquiry.

Figure 13:
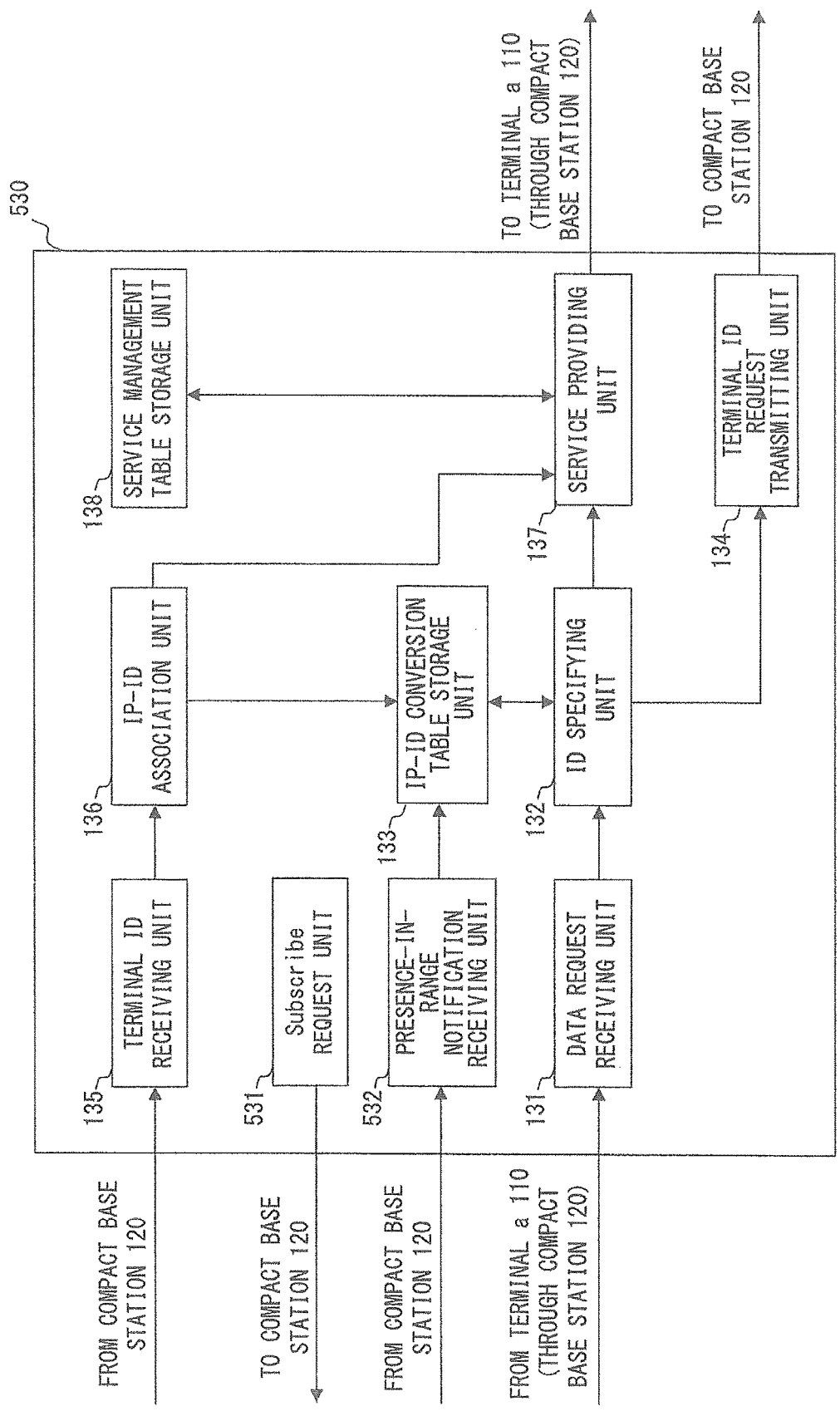
FIG. 13 is a block diagram showing a configuration of a third party server according to the fourth exemplary embodiment.

FIG. 13 is a block diagram showing a configuration of the third party server 530 according to the fourth exemplary embodiment. The third party server 530 includes a Subscribe request unit 531 and a presence-in-range notification receiving unit 532 in addition to the components included in the third party server 130 explained above with reference to FIG. 7. Explanations of parts already explained with reference to FIG. 7 are omitted.

The Subscribe request unit 531 transmits a Subscribe request to the compact base station 520 that is required to perform a Subscribe process. Note that the Subscribe request unit 531 incorporates the IP address of the own server and/or an ID for identifying the own server into the Subscribe request and transmits that Subscribe request including the IP address and/or the ID.

The presence-in-range notification receiving unit 532 receives a presence-in-range notification indicating that a terminal is located in the range and under management of the compact base station 520, which is notified from the compact base station 520 based on the aforementioned Subscribe request. This presence-in-range notification includes a user unique temporary ID for identifying that terminal.

The presence-in-range notification receiving unit 532 stores the user unique temporary ID included in the received presence-in-range notification in the IP-ID conversion table storage unit 133.

The IP-ID conversion table storage unit 133 stores user unique temporary IDs received from the presence-in-range notification receiving unit 532 and IP addresses received from the terminal ID specifying unit 132. However, these user unique temporary IDs and IP addresses are not tied with each other and are stored in an untied state.

The IP-ID association unit 136 selects, from among user unique temporary IDs and IP addresses separately stored in the IP-ID conversion table storage unit 133, an appropriate user unique temporary ID and an appropriate IP address and ties them with each other based on the information received by the terminal ID receiving unit 135. Since the IP-ID association unit 136 performs this tying process, the user unique temporary ID and the IP address of the same terminal are stored in an associated state in the IP-ID conversion table.

As described above, in the fourth exemplary embodiment, when combined with the presence-in-range trigger, a user unique temporary ID that is notified in response to the presence-in-range trigger can be tied with an IP address. Therefore, even when there is no access from the terminal, the user can be identified. Further, when communication from that terminal occurs later, the user unique temporary ID obtained in response to the presence-in-range trigger can be tied with an ID obtained in subsequent communication within the third party server.

As a result, it is possible to collectively handle a user unique temporary ID(s) that is a key(s) for providing a service(s) to a user(s) from which no communication occurs and a user unique temporary ID(s) that is a key(s) for providing a service(s) in subsequent communication, thereby making it possible to, for example, charge the user(s) in a unified manner.

This is because the terminal IP address and the user unique temporary ID of the user using that terminal can be tied with each other within the third party server by comparing the user unique temporary ID acquired from the base station by using the IP address as a key with the user unique temporary ID contained in the presence-in-range trigger that is received from the base station in advance.

As described above in each exemplary embodiment, according to the compact base station in accordance with the present invention, it is possible to manage services without using highly confidential user unique IDs.

Note that the above-described IDs do not necessarily have to be assigned for each server and each terminal. That is, the identical terminal IDs can be used within the LAN, provided that a different terminal ID is used for each terminal.

Further, the above-described IDs do not necessarily have to be different for each third party. That is, they may be different for each third party server. Alternatively, the identical IDs may be used on the same LAN without differentiating them for each third party.

Note that each exemplary embodiment described above is explained for the case of the femto-cell LIPA (Local IP Access) in which the third party server is located on a LAN of the same segment as the femto-cell (compact base station) and communication is performed by using a private IP address. However, the present invention is not limited to this example case.

For example, the third party server may be located outside the LAN. In this case, NAPT (Network Address Port Translation) is disposed on the boundary between the LAN and the Internet, and the third party server accesses the femto-cell from outside of the LAN. The third party server performs "subscribe" for the femto-cell from outside of the LAN through remote access, and the femto-cell provides a user unique temporary ID (second identification information) to the third party server located outside of the LAN. Such network configurations can also be adopted.

Further, the compact base station according to the present invention is not limited to base stations, such as femto-cells, that are smaller than conventional compact base stations. That is, the compact base station according to the present invention can be applied to any base station that provides two network routes to a terminal.

Note that the function of each block explained above in the above-described each exemplary embodiment can be implemented by causing an information processing apparatus (e.g., CPU: Central Processing Unit) to execute a program.

This program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Further, the present invention can take various forms such as a terminal ID providing system, a terminal ID providing method, and a program for providing a terminal ID. Further, the present invention can take other forms such as a communication system including a compact base station in which a compact base station includes an ID holding table and the compact base station sends back an ID relating to a terminal based on an IP address assigned to the terminal, a communication method, and a communication program.

The present invention is not limited to the above-described exemplary embodiments, and they can be modified as desired without departing from the spirit and scope of the invention. For example, the present invention can be described by the following supplementary notes.

(Supplementary Note 1)

A base station apparatus comprising:

first identification information acquisition means for acquiring first identification information for identifying a terminal, the terminal being under management of the base station apparatus;

second identification information generation means for generating second identification information associated with the first identification information acquired by the first identification information acquisition means; and terminal identification information notification means for notifying an external device of the second identification information generated by the second identification information generation means as information for identifying the terminal.

(Supplementary Note 2)

The base station apparatus described in Supplementary note 1, further comprising notification request receiving means for receiving a notification request for the information for identifying the terminal from the external apparatus, wherein the terminal identification information notification means notifies the external device of the second identification information as the information for identifying the terminal based on the notification request received by the notification request receiving means.

(Supplementary Note 3)

The base station apparatus described in Supplementary note 2, further comprising IP address assignment means for assigning an IP address to the terminal; and management means for associating the first identification information, the second identification information, and the IP address of the terminal with each other, and managing them.

(Supplementary Note 4)

The base station apparatus described in Supplementary note 3, wherein the notification request for the information for identifying the terminal includes an IP address of the terminal, and the terminal identification information notification means notifies the second identification information associated with the IP address included in the notification request received by the notification request receiving means in the management means.

(Supplementary Note 5)

The base station apparatus described in any one of Supplementary notes 1 to 4, further comprising:

presence-in-range/connection process request receiving means for receiving a presence-in-range/connection process request including the first identification information transmitted from the terminal; and presence-in-range/connection process request transmitting means for transmitting the presence-in-range/connection process request received by the presence-in-range/connection process request receiving means to an external host apparatus, wherein the first identification information acquisition means acquires the first identification information from the presence-in-range/connection process request received by the presence-in-range/connection process request receiving means.

(Supplementary Note 6)

The base station apparatus described in any one of Supplementary notes 1 to 4, further comprising:

presence-in-range/connection process request receiving means for receiving a presence-in-range/connection process request transmitted from the terminal;

presence-in-range/connection process request transmitting means for transmitting the presence-in-range/connection process request received by the presence-in-range/connection process request receiving means to an external host apparatus; and presence-in-range/connection process response receiving means for receiving a presence-in-range/connection process response including the first identification information transmitted from the host apparatus, the presence-in-range/connection process response being a response to the presence-in-range/connection process request, wherein the first identification information acquisition means acquires the first identification information from the presence-in-range/connection process response received by the presence-in-range/connection process response receiving means.

(Supplementary Note 7)

The base station apparatus described in any one of Supplementary notes 1 to 6, wherein second identification information generation means generates a plurality of different second identification information pieces associated with the first identification information acquired by the first identification information acquisition means, and the terminal identification information notification means selects one of the plurality of different second identification information pieces generated by the second identification information generation means for each of a plurality of different external apparatuses as the information for identifying the terminal based on a notification request for the information for identifying the terminal transmitted from a respective one of the plurality of external apparatuses, and notifies the respective external apparatuses of the selected second identification information pieces.

(Supplementary Note 8)

The base station apparatus described in Supplementary note 1, further comprising subscribe request receiving means for receiving a subscribe request from the external apparatus, wherein the second identification information generation means generates the second identification information associated with the external apparatus and the first identification information, and the terminal identification information notification means notifies the external device of the second identification information generated by the second identification information generation means together with a response to the subscribe request as the information for identifying the terminal.

(Supplementary Note 9)

The base station apparatus described in Supplementary note 8, wherein the subscribe request includes an external apparatus identification information for identifying the external apparatus, and the second identification information generation means generates the second identification information associated with the external apparatus identification information and the first identification information.

(Supplementary Note 10)

The base station apparatus described in Supplementary note 9, further comprising management means for associating the first identification information of the terminal, the second identification information, the IP address, and the external apparatus identification information with each other, and managing them.

(Supplementary Note 11)

The base station apparatus described in any one of Supplementary notes 1 to 9, wherein the first identification information is an IMSI (International Mobile Subscriber Identity) of the terminal.

(Supplementary Note 12)

The base station apparatus described in any one of Supplementary notes 1 to 11, wherein the second identification information generation means uses a hash value calculated based on the first identification information acquired by the first identification information acquisition means and the external apparatus identification information for identifying the external apparatus as the second identification information.

(Supplementary Note 13)

A base station apparatus wherein the base station apparatus described in any one of Supplementary notes 1 to 12 is a femto-cell.

(Supplementary Note 14)

A communication system comprising a base station apparatus capable of wireless connecting to a terminal, and a service providing server connected to the base station apparatus, the terminal being under management of the base station apparatus, wherein the base station apparatus comprises:

first identification information acquisition means for acquiring first identification information for identifying the terminal under management of the base station apparatus;

second identification information generation means for generating second identification information associated with the first identification information acquired by the first identification information acquisition means; and terminal identification information notification means for notifying the service providing server of the second identification information generated by the second identification information means as information for identifying the terminal, and the service providing server comprises:

second identification information receiving means for receiving the second identification information notified from the base station; and service providing means for providing a service based on the second identification information received by the second identification information receiving means.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent application No. 2012-022335, filed on Feb. 3, 2012, the disclosure of which is incorporated herein in its entirety by reference.

REFERENCE SIGNS LIST

10 COMMUNICATION SYSTEM
101 TERMINAL
102 COMPACT BASE STATION
103 THIRD PARTY SERVER
105 MOBILE NETWORK MANAGEMENT NODE GROUP
110 TERMINAL
120 COMPACT BASE STATION
121 TERMINAL COMMUNICATION UNIT
122 TERMINAL IP ADDRESS DISPENSING UNIT
123 CORE NETWORK COMMUNICATION UNIT
124 LAN COMMUNICATION UNIT
125 I/F UNIT
126 BASE STATION CONTROL UNIT
127 GENERATION/MANAGEMENT/RESPONSE UNIT
128 TABLE HOLDING UNIT
130 THIRD PARTY SERVER
131 DATA REQUEST RECEIVING UNIT
132 TERMINAL ID SPECIFYING UNIT
133 CONVERSION TABLE STORAGE UNIT
134 TERMINAL ID REQUEST TRANSMITTING UNIT
135 TERMINAL ID RECEIVING UNIT
136 IP-ID ASSOCIATION UNIT
137 SERVICE PROVIDING UNIT
138 SERVICE MANAGEMENT TABLE STORAGE UNIT
140 SECURITY GATEWAY
150 MOBILE NETWORK MANAGEMENT NODE GROUP
210 FIRST IDENTIFICATION INFORMATION ACQUISITION UNIT
220 SECOND IDENTIFICATION INFORMATION GENERATION UNIT
230 TERMINAL IDENTIFICATION INFORMATION NOTIFICATION UNIT
240 PRESENCE-IN-RANGE/CONNECTION PROCESS REQUEST RECEIVING UNIT
241 PRESENCE-IN-RANGE/CONNECTION PROCESS REQUEST TRANSMITTING UNIT
242 PRESENCE-IN-RANGE/CONNECTION PROCESS RESPONSE RECEIVING UNIT
243 PRESENCE-IN-RANGE/CONNECTION PROCESS RESPONSE TRANSMITTING UNIT
250 LAN CONNECTION REQUEST RECEIVING UNIT
260 IP ADDRESS ASSIGNMENT UNIT
270 MANAGEMENT UNIT
280 NOTIFICATION REQUEST RECEIVING UNIT
320 COMPACT BASE STATION
420 COMPACT BASE STATION
520 COMPACT BASE STATION
521 Subscribe REQUEST RECEIVING UNIT
522 MANAGEMENT UNIT
523 PRESENCE-IN-RANGE NOTIFICATION UNIT
530 THIRD PARTY SERVER
531 Subscribe REQUEST UNIT
532 PRESENCE-IN-RANGE NOTIFICATION RECEIVING UNIT

The invention claimed is:

1. A base station apparatus comprising:
first identification information acquisition unit for acquiring first identification information for identifying a terminal, the terminal being under management of the base station apparatus;
second identification information generation unit for generating second identification information based on the first identification information acquired by the first identification information acquisition unit, the second identification information is to identify the terminal in a service providing server and is kept even when the terminal moves out from under the management of the base station apparatus; and
terminal identification information notification unit for notifying the service providing server of the second identification information generated by the second identification information generation unit.

2. The base station apparatus according to claim 1, further comprising notification request receiving unit for receiving a notification request for the information for identifying the terminal from the external apparatus, wherein
the terminal identification information notification unit notifies the service providing server of the second identification information as the information for identifying the terminal based on the notification request received by the notification request receiving unit.

3. The base station apparatus according to claim 2, further comprising
IP address assignment unit for assigning an IP address to the terminal; and
management unit for associating the first identification information, the second identification information, and the IP address of the terminal with each other, and managing them.

4. The base station apparatus according to claim 3, wherein
the notification request for the information for identifying the terminal includes an IP address of the terminal, and
the terminal identification information notification unit notifies the service providing server of the second identification information associated with the IP address included in the notification request received by the notification request receiving unit in the management unit.

5. The base station apparatus according to claim 1, further comprising:
presence-in-range/connection process request receiving unit for receiving a presence-in-range/connection process request including the first identification information transmitted from the terminal; and
presence-in-range/connection process request transmitting unit for transmitting the presence-in-range/connection process request received by the presence-in-range/connection process request receiving unit to an external host apparatus, wherein
the first identification information acquisition unit acquires the first identification information from the presence-in-range/connection process request received by the presence-in-range/connection process request receiving unit.

6. The base station apparatus according to claim 1, further comprising:
presence-in-range/connection process request receiving unit for receiving a presence-in-range/connection process request transmitted from the terminal;
presence-in-range/connection process request transmitting unit for transmitting the presence-in-range/connection process request received by the presence-in-range/connection process request receiving unit to an external host apparatus; and
presence-in-range/connection process response receiving unit for receiving a presence-in-range/connection process response including the first identification information transmitted from the host apparatus, the presence-in-range/connection process response being a response to the presence-in-range/connection process request, wherein the first identification information acquisition unit acquires the first identification information from the presence-in-range/connection process response received by the presence-in-range/connection process response receiving unit.

7. The base station apparatus according to claim 1, wherein the second identification information generation unit generates a plurality of different second identification information pieces associated with the first identification information acquired by the first identification information acquisition unit, and the terminal identification information notification unit selects one of the plurality of different second identification information pieces generated by the second identification information generation unit for each of a plurality of different external apparatuses as the information for identifying the terminal based on a notification request for the information for identifying the terminal transmitted from a respective one of the plurality of external apparatuses, and notifies the respective external apparatuses of the selected second identification information pieces.

8. The base station apparatus according to claim 1, further comprising subscribe request receiving unit for receiving a subscribe request from the external apparatus, wherein the second identification information generation unit generates the second identification information associated with the external apparatus and the first identification information, and the terminal identification information notification unit notifies the service providing server of the second identification information generated by the second identification information generation unit together with a response to the subscribe request as the information for identifying the terminal.

9. The base station apparatus according to claim 8, wherein the subscribe request includes an external apparatus identification information for identifying the external apparatus, and the second identification information generation unit generates the second identification information associated with the external apparatus identification information and the first identification information.

10. A communication system comprising a base station apparatus capable of wireless connecting to a terminal, and a service providing server connected to the base station apparatus, the terminal being under management of the base station apparatus, wherein the base station apparatus comprises:

first identification information acquisition unit for acquiring first identification information for identifying the terminal under management of the base station apparatus;

second identification information generation unit for generating second identification information based on the first identification information acquired by the first identification information acquisition unit, the second identification information is to identify the terminal at the service providing server and is kept even when the terminal moves out from under the management of the base station apparatus; and terminal identification information notification unit for notifying the service providing server of the second identification information generated by the second identification information generation unit, and the service providing server comprises:

second identification information receiving unit for receiving the second identification information notified from the base station apparatus; and service providing unit for providing a service based on the second identification information received by the second identification information receiving unit.

11. A base station apparatus comprising:

first identification information acquisition means for acquiring first identification information for identifying a terminal, the terminal being under management of the base station apparatus;

second identification information generation means for generating second identification information based on the first identification information acquired by the first identification information acquisition means, the second identification information is to identify the terminal at an service providing server and is kept even when the terminal moves out from under the management of the base station apparatus; and terminal identification information notification means for notifying the service providing server of the second identification information generated by the second identification information generation means.

12. The base station according to claim 1, wherein the second identification information identifies the terminal at the service providing server and does not change when the terminal moves out of a communication range of the base station apparatus.

13. The base station according to claim 1, wherein the second identification information does not change when the terminal moves out of a communication range of the base station apparatus for a single or a repeated number of times.

14. The base station according to claim 1, wherein the second identification information is void of an IP (Internet Protocol) address.

15. The base station according to claim 1, further comprising a computer readable medium storing program instructions executable by a processor, the processor configured to execute instructions according to the first identification information acquisition unit, the second identification information generation unit, and the terminal identification information notification unit.

16. A computer program product for a base station according to claim 1, the computer program product comprising a computer readable storage medium having program instructions embodied therewith, the program instructions readable and executable by a computer to cause the computer to execute instructions according to the first identification information acquisition unit, the second identification information generation unit, and the terminal identification information notification unit.

17. The base station apparatus according to claim 1, wherein the terminal identification information notification unit notifies the service providing server of the second identification information generated by the second identification information generation unit without transmission of the first identification information.

18. The base station apparatus according to claim 1, wherein the terminal identification information notification unit notifies the service providing server with only the second identification information generated by the second identification information generation unit.

19. The base station apparatus according to claim 1, wherein the terminal identification information notification unit notifies the service providing server of the second identification information comprising a temporary identification of the terminal generated by the second identification information generation unit, while concealing the first identification information from the service providing server.

20. The base station apparatus according to claim 1, wherein terminal identification information notification unit sends the second identification information that is temporary to the service providing server of without transmission of the first identification information that is acquired, and wherein the second identification information, generated by terminal identification information notification unit, is different than a TMSI (Temporary Mobile Subscriber Identity) and a IMSI (International Mobile Subscriber Identity).

* * * * *